US012572869B2

(12) United States Patent
Bradbury et al.

(10) Patent No.: US 12,572,869 B2
(45) Date of Patent: **\*Mar. 10, 2026**

(54) SYSTEMS AND METHODS FOR RESOURCE MANAGEMENT AND SCHEDULING

(71) Applicant: STOKE Space Technologies, Inc., Kent, WA (US)

(72) Inventors: Brent Andrew Bradbury, Seattle, WA (US); Andrew Lapsa, Seattle, WA (US)

(73) Assignee: STOKE Space Technologies, Inc., Kent, WA (US)

( \* ) Notice: Subject to any disclaimer, the term of this patent is extended or adjusted under 35 U.S.C. 154(b) by 57 days.

This patent is subject to a terminal disclaimer.

(21) Appl. No.: 18/625,555

(22) Filed: Apr. 3, 2024

(65) Prior Publication Data

US 2024/0281740 A1 Aug. 22, 2024

Related U.S. Application Data

(63) Continuation-in-part of application No. 18/490,510, filed on Oct. 19, 2023, now Pat. No. 11,977,999, which is a continuation of application No. 18/361,607, filed on Jul. 28, 2023, now Pat. No. 11,823,108.

(60) Provisional application No. 63/379,466, filed on Oct. 14, 2022.

(51) Int. Cl.
G06Q 10/0633 (2023.01)

(52) U.S. Cl.
CPC .................................. G06Q 10/0633 (2013.01)

(58) Field of Classification Search
CPC .......................................... G06Q 10/00–50/00
USPC ................................................. 705/7.11–7.42
See application file for complete search history.

(56) References Cited

U.S. PATENT DOCUMENTS

| | | | | | |
|---|---|---|---|---|---|
| 6,115,646 | A | * | 9/2000 | Fiszman ................ | G06Q 10/10 |
| | | | | | 700/86 |
| 6,279,009 | B1 | * | 8/2001 | Smirnov ................ | G06Q 10/06 |
| | | | | | 707/999.102 |
| 6,338,053 | B2 | * | 1/2002 | Uehara ................ | G06F 16/284 |
| | | | | | 705/28 |
| 7,822,706 | B1 | * | 10/2010 | Baltazar ................ | G06Q 10/10 |
| | | | | | 707/802 |

(Continued)

OTHER PUBLICATIONS

Final Office Action for U.S. Appl. No. 18/786,544 dated Jan. 22, 2025, pp. 1-59.

(Continued)

*Primary Examiner* — Alan S Miller
(74) *Attorney, Agent, or Firm* — Pillsbury Winthrop Shaw Pittman LLP

(57) ABSTRACT

A system for managing resources and scheduling is disclosed. The system includes a client computer, software executable by the client computer for providing a user interface, a server in data communication with the client computer, a database for storing data in a hierarchical data structure, and a data fusion engine executing on the server. The hierarchical data structure includes a parent node and child nodes linked to the parent node. The data fusion engine is configured to log a workflow to at least one of the child nodes based on user input received via the user interface. A related method and software is also disclosed.

32 Claims, 16 Drawing Sheets

(56) References Cited

U.S. PATENT DOCUMENTS

| | | | | |
|---|---|---|---|---|
| 8,244,668 B1 * | 8/2012 | Baltazar | G06Q 10/06 | |
| | | | | 707/802 |
| 8,738,414 B1 * | 5/2014 | Nagar | G06Q 10/103 | |
| | | | | 705/7.12 |
| 9,348,489 B1 * | 5/2016 | Cline | G06F 3/0482 | |
| 9,629,928 B1 * | 4/2017 | Olsen | A61K 48/00 | |
| 10,852,712 B2 * | 12/2020 | Ben-Bassat | G06K 7/10 | |
| 2003/0065574 A1 | 4/2003 | Lawrence | | |
| 2003/0217054 A1 * | 11/2003 | Bachman | G06Q 10/107 | |
| 2004/0015487 A1 * | 1/2004 | Lin | G06F 16/24534 | |
| 2004/0117795 A1 * | 6/2004 | Wang | G06Q 10/10 | |
| | | | | 718/106 |
| 2004/0205711 A1 * | 10/2004 | Ishimitsu | G06F 9/451 | |
| | | | | 717/116 |
| 2008/0065448 A1 * | 3/2008 | Hull | G06Q 10/06 | |
| | | | | 705/7.26 |
| 2009/0281777 A1 * | 11/2009 | Baeuerle | G06Q 10/06 | |
| | | | | 703/6 |
| 2010/0106282 A1 * | 4/2010 | Mackelprang | G06Q 10/06 | |
| | | | | 700/115 |
| 2010/0322256 A1 * | 12/2010 | Riley | H04L 45/64 | |
| | | | | 370/400 |
| 2011/0225565 A1 * | 9/2011 | van Velzen | G06F 9/5038 | |
| | | | | 705/348 |
| 2011/0251975 A1 * | 10/2011 | Evans | G06Q 10/10 | |
| | | | | 705/348 |
| 2014/0047028 A1 * | 2/2014 | Buth | G06F 9/546 | |
| | | | | 709/204 |
| 2015/0127412 A1 * | 5/2015 | Kothandaraman | | |
| | | | G06Q 30/0635 | |
| | | | | 705/7.26 |
| 2016/0154910 A1 * | 6/2016 | Altare | G06Q 10/06 | |
| | | | | 703/13 |
| 2020/0134001 A1 * | 4/2020 | Kantamsetty | G06F 16/2246 | |
| 2021/0192450 A1 * | 6/2021 | Bachant | G07C 5/008 | |

OTHER PUBLICATIONS

Notice of Allowance for U.S. Appl. No. 18/625,561 dated Apr. 2, 2025, pp. 1-14.

How To Fix CPU Failure, 2022, https://ms.codes/en-gb/blogs/computer-hardware/how-to-fix-cpu-failure (Year: 2022), pp. 1-19.

Owen-Hill, https://robodk.com/blog/electronic-product-testing/, Jan. 2022, https://robodk.com/blog/electronic-product-testing/ (Year: 2022), pp. 1-13.

Murray, https:/Avww.liveabout.com/bill-of-materials-2221363, Jan. 2019, https:/Avww.liveabout.com/bill-of-materials-2221363 (Year: 2019), pp. 1-11.

Eshuis, Rik, and Roel Wieringa. "Verification support for workflow design with UML activity graphs." Proceedings of the 24th international conference on Software engineering. 2002. (Year: 2002).

Chen, Sen, et al. "Top-down human-cyber-physical data fusion based on reinforcement learning." IEEE Access 8 (2020): 134233-134245. (Year: 2020).

Tu, Y. L., S. Q. Xie, and J. J. Kam. "Rapid one-of-a-kind production." The International Journal of Advanced Manufacturing Technology 29 (2006): 499-510. (Year: 2006).

Apiliogullan, U.itfi. "Digital transformation in project-based manufacturing: Developing the ISA-95 model for vertical integration." International Journal of Production Economics 245 (2022): 108413. (Year: 2022).

Chinchanikar, Satish, and Avez A. Shaikh. "A review on machine learning, big data analytics, and design for additive manufacturing for aerospace applications." Journal of Materials Engineering and Performance 31.8 (2022): 6112-6130. (Year: 2022).

Non-Final Office Action for U.S. Appl. No. 18/786,544 dated Sep. 24, 2024, pp. 1-21.

Non-Final Office Action for U.S. Appl. No. 18/625,561 dated Nov. 20, 2024, pp. 1-20.

Notice of Allowance for U.S. Appl. No. 18/361,607, dated Sep. 20, 2023, pp. 1-7 4.

Non-Final Office Action for U.S. Appl. No. 18/490,510, dated Jan. 16, 2024, pp. 1-21.

Notice of Allowance for U.S. Appl. No. 18/490,510, dated Mar. 6, 2024, pp. 1-9.

* cited by examiner

SYSTEMS AND METHODS FOR RESOURCE MANAGEMENT AND SCHEDULING

RELATED APPLICATIONS

This application is a continuation-in-part of U.S. patent application Ser. No. 18/490,510 titled "SYSTEM FOR MANAGING RESOURCES AND SCHEDULING, AND RELATED METHOD AND SOFTWARE", filed Oct. 19, 2023, which is a continuation of U.S. patent application Ser. No. 18/361,607 titled "SYSTEM FOR MANAGING RESOURCES AND SCHEDULING, AND RELATED METHOD AND SOFTWARE", filed Jul. 28, 2023 (now U.S. Pat. No. 11,823,108), which claims benefit of and priority to U.S. Provisional Patent Application No. 63/379, 466 titled "SYSTEM FOR MANAGING RESOURCES AND SCHEDULING, AND RELATED METHOD AND SOFTWARE" filed Oct. 14, 2023, the entireties of which are hereby incorporated by reference.

TECHNICAL FIELD

The present disclosure relates to systems for resource management and scheduling.

BACKGROUND

In complex manufacturing environments, the manufacturer needs to be able to optimize their resources and scheduling. This requires the collection and real-time monitoring of data from all stages of the manufacturing process, including procurement, design, assembly, testing, validation, and warehousing. The manufacturer needs a highly flexible system capable of adapting to disruptions, changes in part designs, availability of materials and machines, and customer demand. This is especially true in aerospace manufacturing environments, which require fast-paced hardware-focused iterative development and the need to maintain organizational knowledge. Modern aerospace companies need to design fast, build fast, test fast, learn fast, and iterate fast. These manufacturers aim to achieve a speed of development and a level of capital efficiency that is unique relative to other industries.

There are several known enterprise resource planning (ERP) software products that provide manufacturers with tools for managing resources and scheduling. However, existing ERP software products lack the flexibility needed to properly adapt to highly complex manufacturing environments such as those in the aerospace industry. For example, existing ERP software uses workflows to assign tasks and track project progress, but the software effectively assumes that users know what they want to build before they build it, which is not always the case. With existing ERP software, workflows can only be associated with known objects, and new workflows can only be created via custom, code-based programming. In environments with fast-paced hardware-focused iterative developments, software developers are never able to program new workflows fast enough to keep up with the rapid manufacturing changes.

Aspects of the present invention are directed to these and other problems.

SUMMARY

According to an aspect of the present invention, a system for managing resources and scheduling is provided. The system includes a client computer, software executable by the client computer for providing a user interface, a server in data communication with the client computer, a database for storing data in a hierarchical data structure and a data fusion engine executing on the server. The hierarchical data structure includes a parent node and child nodes linked to the parent node. The data fusion engine is configured to log a workflow to at least one of the child nodes based on user input received via the user interface.

According to another aspect of the present invention, a system is provided that includes a client computer, software executable by the client computer for providing a user interface, a server in data communication with the client computer, a database, and a data fusion engine executing on the server. The database includes a parent directory and nodes linked to the parent directory. Each of the nodes is associated with a respective real-world inventory item or a respective part to be manufactured. The data fusion engine is configured to log a workflow to at least one of the nodes based on user input received via the user interface.

According to another aspect of the present invention, a method for managing resources and scheduling is provided. The method includes the steps of: providing a user interface on a client computer; storing data in a hierarchical data structure having a parent node and a plurality of child nodes; and logging a workflow to at least one of the plurality of child nodes based on user input received via the user interface.

According to another aspect of the present invention, a non-transitory computer-readable storage medium that stores instructions to be executed by at least one computer is provided. The instructions, when executed, cause the at least one computer to perform steps including: providing a user interface on a client computer; storing data in a hierarchical data structure having a parent node and a plurality of child nodes; and logging a workflow to at least one of the plurality of child nodes based on user input received via the user interface.

According to another aspect of the present invention, a software-as-a-service (SaaS) platform is provided that includes a server, a database, and a data fusion engine executing on the server. The server is in data communication with a plurality of client computers. The database stores data in a hierarchical data structure having a parent node and child nodes linked to the parent node. The data fusion engine is configured to log a workflow to at least one of the child nodes based on user input received via at least one client computer of the plurality of client computers.

In addition to, or as an alternative to, one or more of the features described above, further aspects of the present invention can include one or more of the following features, individually or in combination:

at least one of the child nodes is a leaf node, and the data fusion engine is configured to log the workflow to the leaf node;

the workflow includes a workflow template and a workflow instance based on the workflow template;

the workflow further includes a workflow scope linked to the workflow template, and the workflow scope identifies the child nodes and/or types of child nodes to which the workflow template and the workflow instance are logged or will be logged;

the data fusion engine includes a workflow scope selector configured to log the workflow template and the workflow instance to the child nodes and/or types of child nodes identified by the workflow scope;

the workflow includes a task to be executed and a status of the task;

the data fusion engine is configured to monitor the work-flow for detection of a change in the status of the task, the data fusion engine is configured to execute a rules-based action in response to the detection of the change in the status of the task, and the rules-based action includes at least one of instantiating another workflow instance, executing another workflow instance, generating an approval request, and transmit-ting an approval request;

the data fusion engine is configured to log the workflow to the at least one child node based on no-code user input received via the user interface;

the data fusion engine is configured to log the workflow to the at least one child node based on low-code user input received via the user interface;

the system is an enterprise system configured for use by a plurality of users, and the data fusion engine is configured to log a workflow to at least one of the child nodes based on user input received via the user inter-face from any of the plurality of users of the enterprise system;

the parent node is defined by a parent directory, at least some of the child nodes are defined by inventory item nodes, each corresponding to a real-world inventory item, and the data fusion engine is configured to log the workflow to at least one of the inventory item nodes based on user input received via the user interface;

at least some of the child nodes are defined by part nodes, each including a design file for a respective part to be manufactured, and the data fusion engine is configured to log a second workflow to at least one of the part nodes based on user input received via the user inter-face;

at least one of the child nodes is defined by a test node, and the data fusion engine is configured to log a third workflow to the test node;

the user interface includes at least one of an inventory interface for user interfacing with the inventory node, a parts library interface for user interfacing with the parts library node, and a test interface for user inter-facing with the test node;

the data fusion engine is configured to edit data saved to hierarchical data structure based on user input received via the user interface;

the child nodes are defined by at least one of a file, a record, a field, a template, and an instance;

the data fusion engine is in data communication with an integrated SaaS tool, the workflow is at least one of created and edited by the integrated SaaS tool based on user input received via the user interface, and the data fusion engine is configured to log the workflow to the at least one child node after the workflow is at least one of created and edited by the integrated SaaS tool;

the data fusion engine is configured to create and edit workflows independent of the integrated SaaS tool based on user input received via the user interface;

the data fusion engine is configured to generate an index of all bill of materials (BOM) saved in the database, and the user interface includes a BOM interface for displaying the index;

the data fusion engine is configured to generate a queue including all completed, in progress, and/or pending tasks associated with workflows saved to the hierarchi-cal data structure, and the user interface includes a queue interface for displaying the queue;

the data fusion engine is in data communication with a test sensor configured to generate test data regarding a real-world inventory item, at least one of the child nodes is an inventory item node corresponding to the real-world inventory item, and the data fusion engine is configured to receive the test data from the test sensor and log the test data to the inventory item node; and the data fusion engine is in data communication with a test sensor configured to generate test data regarding a part to be manufactured, at least one of the child nodes is a part node corresponding to the part to be manufactured, and the data fusion engine is configured to receive the test data from the test sensor and log the test data to the part node.

These and other aspects of the present invention will become apparent in light of the drawings and detailed description provided below.

DETAILED DESCRIPTION

Figure 1:
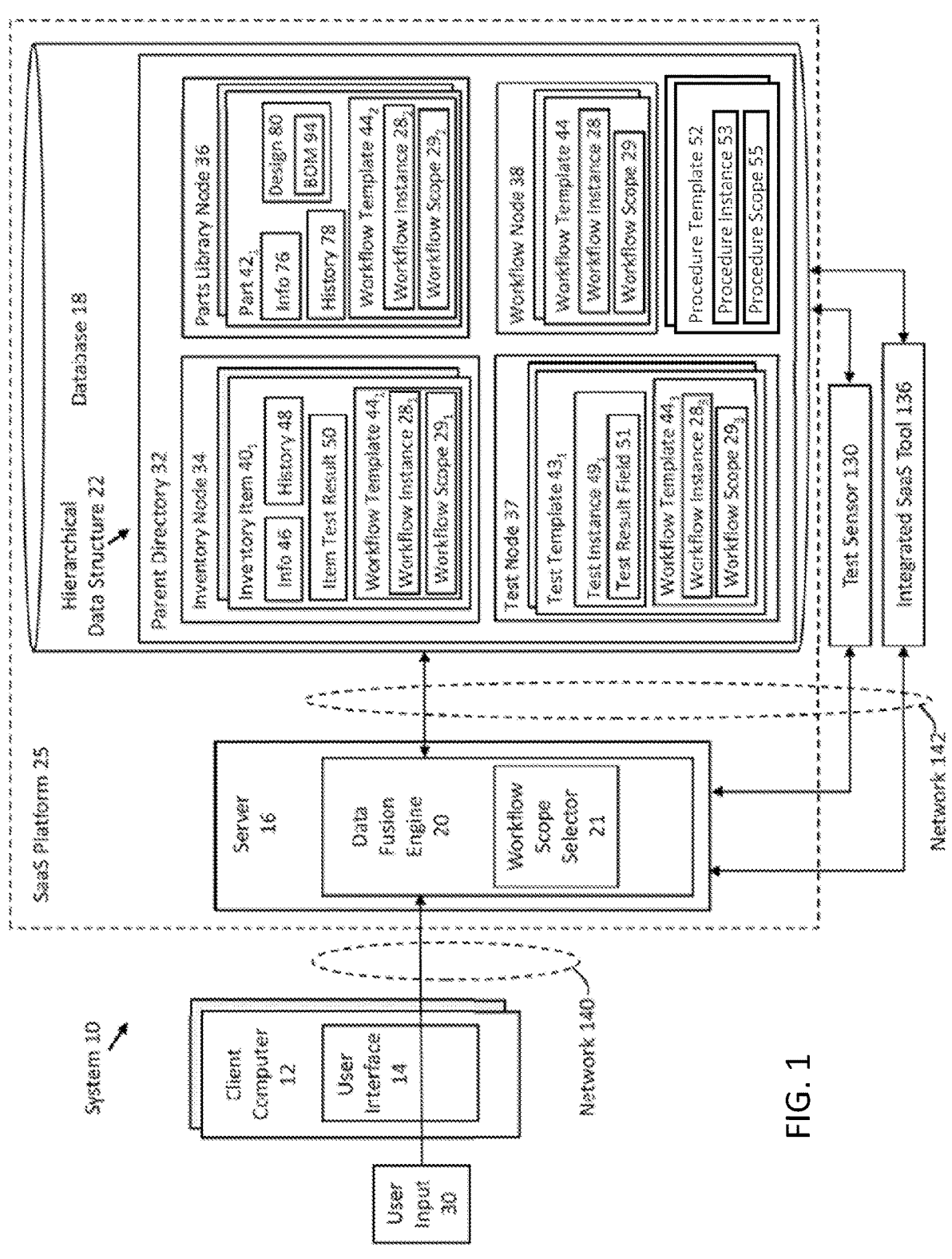
FIG. 1 schematically illustrates the present system for managing resources and scheduling.

Referring to FIG. 1, the present disclosure describes a system 10 for managing resources and scheduling, and a related method and software.

Figure 2:
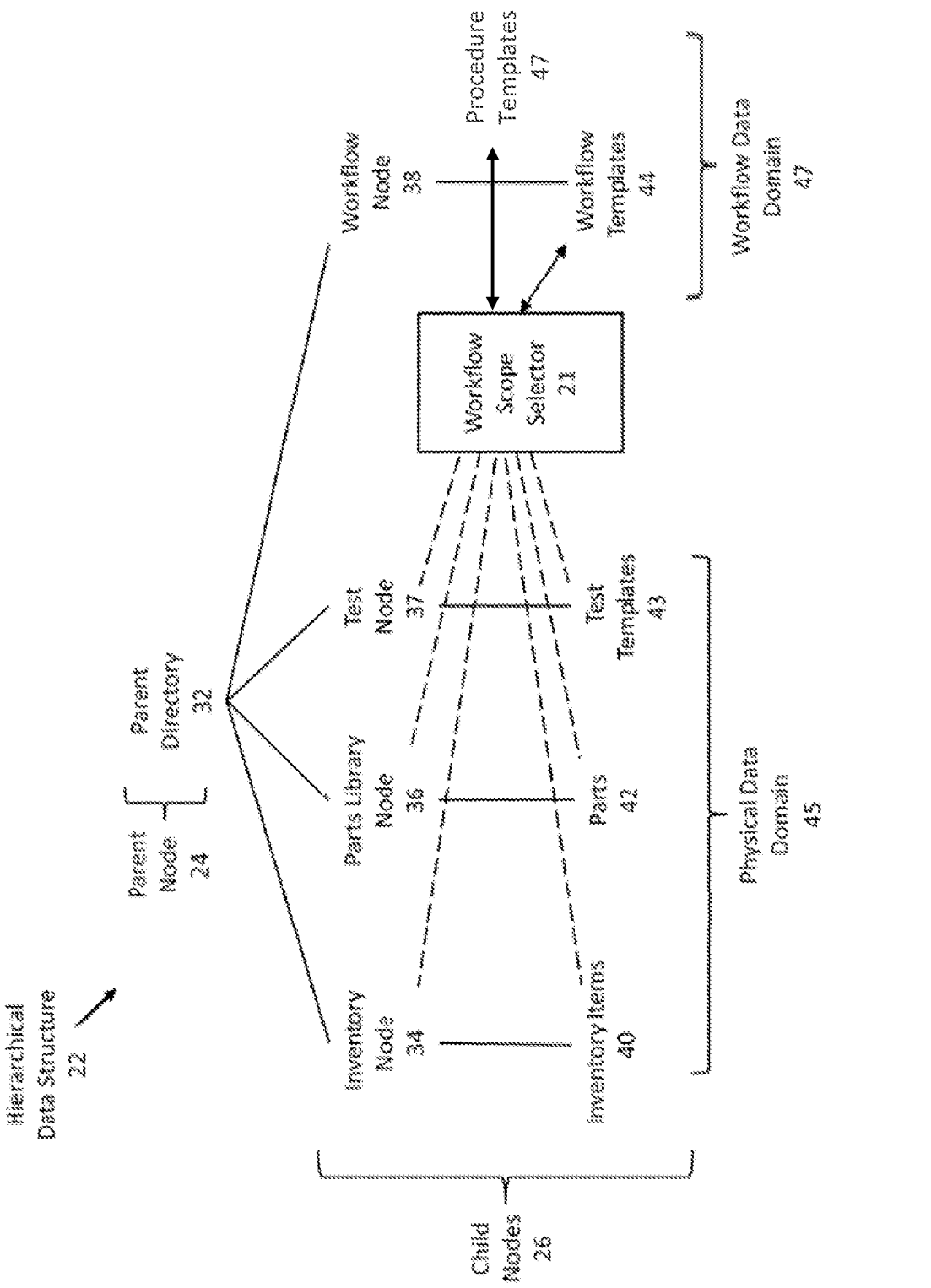
FIG. 2 schematically illustrates a portion of the hierar-chical data structure of the database of FIG. 1.

Referring to FIG. 1, the system 10 includes one or more client computers 12, software executable by each of the client computers 12 for providing a user interface 14 thereon, at least one server 16 in data communication with the client computers 12, at least one database 18 in data communication with the server 16, and at least one data fusion engine 20 executing on the server 16. Referring to FIGS. 1 and 2, the database 18 is configured to store data in a hierarchical data structure 22 having a parent node 24 and a plurality of child nodes 26 linked to (e.g., descendent from) the parent node 24. The data fusion engine 20 is configured to log at least one workflow to at least one of the child nodes 26 based on user input 30 received via the user interface 14. The workflow includes at least one of a workflow template 44 and an instance of a workflow based on the workflow template 44 (hereinafter a "workflow instance 28").

In some embodiments, an item is associated with a scope that defines one or more child nodes 26 and/or one or more types (or other characteristics) of child nodes 26 to which the item (and corresponding items) can be logged. For example, the workflow template 44 includes a workflow scope 29 defining one or more child nodes 26 and/or one or more types of child nodes 26 to which the workflow template 44 and corresponding workflow instances 28 can be logged. In such embodiments, the data fusion engine 20 includes a workflow scope selector 21 configured to control the logging of workflow instances 28 to certain child nodes 26 based on the workflow scope 29. For example, workflow scope selector 21 may ensure that workflow instances 28 associated with a given scope are logged only to child nodes 26 that meet requirements defined by the scope.

In some embodiments, a scope for a given item defines other items to which the given item can be associated with. In the context of a template type item, a scope of the template may define what types of nodes or other items that the template can be associated with. For example, where a given workflow template defines a basic structure of a workflow to be performed for an item, such as a series of steps for a manufacturing a part, a scope for the given workflow template may define the types of items, such as different types of parts, that the given workflow template and its structure of a workflow can be applied to. This may, for example, enable an unpopulated workflow template to be created that defines a series of manufacturing steps for a given class of parts, where a corresponding scope is defined that limits use of the workflow template to the class of parts. In such an embedment, the workflow template may, in turn, be linked (or "logged") to one or more parts within the class of parts based on the workflow template having a scope that corresponds to the class of parts. Employing such a workflow template may include, for example, for each of the one or more parts the workflow template is linked to, populating the workflow template with values (e.g., manufacturing parameters) specific to the linked part to generate a corresponding workflow instance that is linked (or "logged") to the part (e.g., a populated version of the template for the part). The resulting workflow instance for a given part may, in turn, be executed to cause performance of the specific workflow for the part, using the values specific to the linked part (e.g., manufacturing of the part based on the specific manufacturing parameters for the part, specified in the populated version of the template for the part).

In some embodiments, a scope defines characteristics of items that a given item can be applied to or characteristics of items that the given item cannot be applied. For example, a template scope for a given template may define types of parts the given template is allowed to be linked to or types of parts that the given template cannot be linked to (e.g., what types of parts that the given template is or is not prohibited from being linked to). For example, a first scope for a first workflow template outlining storage procedures for a relatively non-critical part may specify that the first workflow template can only be linked to non-critical type parts (and may specify that it cannot be linked to critical type parts), and a second scope for a second workflow template outlining storage procedures for a relatively critical part may specify that the second workflow template can be linked to critical type parts (and may or may not specify that it can or cannot be linked to non-critical type parts).

Such a scoping technique may provide rules-based limitations and enforcement that ensure only compatible items are linked together and that non-compatible items are not linked together. This may be particularly useful in circumstances where certain items are suitable for use with certain items or situations, but not others. For example, where an manufacturer of flight systems employs a first type of parts that are designated for use in ground testing of operations of a flight system (e.g., "non-flight" type parts) and a second type of parts that are designated for use in flight operations of the flight system (e.g., a "flight" type part), the manufacturer may employ a first set of relatively less strict manufacturing procedures that are allowed for non-flight parts (e.g., testing or handling by certified and non-certified technicians, relatively less strict tolerance requirements and verification procedures, or the like) and employ a second set of relatively strict manufacturing procedures that are allowed (or required) for flight parts (e.g., testing or handling by only certified technicians, relatively strict tolerance requirements and verification procedures, or the like). This may, for example, ensure that flight parts are treated with the utmost level of care and detail to ensure safe and effective flights, and ensure that less critical parts are treated with at least reasonable care and detail to enable efficient and effective research and development. In such an embodiment, a workflow template that defines processes suitable for non-flight parts may be associated with a "non-flight" workflow scope that enables the workflow template to be used to generate and link workflow instances (e.g., a process based on populating the structure of a workflow defined by the workflow template) for "non-flight" type parts (and prohibits use of the workflow template for generating and linking workflow instances for "flight" type parts). Similarly, a workflow template that defines processes suitable for flight parts may be associated with a "flight" workflow scope that enables the workflow template to be used to generate workflow instances for "flight" type parts (and allows or prohibits use of the workflow template for generating and linking workflow instances for "non-flight" type parts). Although examples are described in the context of parts type items and manufacturing processes for the sake of explanation, embodiments can be applied to any suitable items, templates and associated processes.

In some embodiments, the scope selector 21 provides for defining the scope of items. For example, the scope selector 21 may employ user interface 14 that enables a user to select or otherwise define a scope to be associated with a given item. Continuing with the above example, the scope selector 21 may display details of a given workflow template, such as a listing of processes defined by the workflow template, along with an option to select the type of parts, such as "flight" or "non-flight," to which the given workflow template can or cannot be associated. Such an embodiment may provide an efficient and effective mechanism to enable users to quickly and easily specify how an item can be implemented. Continuing with the above example, the scope selector 21 may present, via user interface 14, the manufacturer of flight systems with a listing of various workflow templates, including the first workflow template that defines processes suitable for non-flight parts, the second workflow template that defines processes suitable for flight parts, and so forth. Upon selection of the first workflow template, the scope selector 21 may present the manufacturer with details of the first workflow (e.g., a summary or outline of the first set of relatively less strict manufacturing procedures), along with an option to select one or more type of items that the first workflow can (or cannot) be associated (e.g., "linked" or "logged") with, including a selectable listing of flight-type parts, non-flight type parts, raw material type items, and so forth. In response, the manufacturer may select or otherwise indicate, via user input 30, that the first workflow can be associated with non-flight type parts (and that it cannot be associated with flight-type parts or raw materials). As a result, it may be possible to link the first workflow template, or corresponding workflow instances generated therefrom, to non-flight type parts. Similarly, upon selection of the second workflow template, the scope selector 21 may present, via user interface 14, the manufacturer with details of the second workflow (e.g., a summary or outline of the second set of relatively strict manufacturing procedures), along with an option to select one or more type of items that the second workflow can (or cannot) be associated (e.g., "linked" or "logged") with, including a selectable listing of flight-type parts, non-flight type parts, raw material type items, and so forth. In response, the manufacturer may select or otherwise indicate, via user input 30, that the second workflow can be associated with flight type parts (and that it cannot be associated with non-flight parts, raw material type items, or the like). As a result, it may be possible to link the second workflow template (or corresponding workflow instances generated therefrom) to flight type parts. If, for example, the manufacturer believes the procedures of the second workflow are suitable for use with non-flight parts in some instances, the manufacturer may select or otherwise indicate that the second workflow can be associated with non-flight type parts. Where, for example, templates are only allowed to be logged to items that are explicitly identified as such in their associated scope, it may not be necessary to indicate what items a workflow cannot be associated with. That is, a selector may only need to identify items (or characteristics of items) to which the template can be logged. Where, for example, templates are allowed to be logged to items that are not explicitly disapproved of by their associated scope, it may not be necessary to indicate what items a workflow can be associated with. That is a selector may only need to identify items (or characteristics of items) to which the template cannot be logged. In some instances, a selector can identify items (or characteristics of items) to which the template can and cannot be logged.

During operation, the scope selector 21 determines whether two items can be linked based on an associated scope of the items to be linked, and allows or probits linking of the items based on the determination. Continuing with the above example, where a workflow template 44 specifies a workflow for testing non-flight parts and is associated with a workflow scope 29 that specifies that it is allowable to link the workflow template 44 to non-flight parts, in response to a user requesting to log the workflow template 44 to a non-flight type part, the scope selector 21 may determine that the workflow template 44 can be linked to non-flight parts, confirm that the part is a non-flight part (within the associated scope), and, in response, allow the linking of the workflow template 44 to the part, which may include populating the workflow template 44 with manufacturing parameters specific to the part to create a workflow instance 28 for manufacturing the part. In response to a user requesting to log the workflow template 44 to a flight type part, the scope selector 21 may determine that the workflow template 44 can be linked to non-flight parts, determine that the part is a flight part (not within the associated scope), and, in response, prohibit the linking of the workflow template 44 to the part, such that the workflow template 44 cannot be used to create a workflow instance 28 for manufacturing the flight type part.

The child nodes 26 correspond to a wide range of objects, including real-world inventory items, designs for parts to be manufactured, and procedures, such as tests of the inventory items and/or parts, for example. The system 10 overcomes the above-mentioned problems with existing ERP software products in part by allowing all or substantially all users of the system 10 to log workflows to any one of these data objects.

Referring still to FIG. 1, the number of client computers 12 included in the system 10 can vary. In some embodiments, the system 10 is an enterprise system with hundreds or thousands of client computers 12 in data communication with the server 16, for example. In the illustrated embodiment, the server 16, database 18, data fusion engine 20, and hierarchical data structure 22 are elements of a software-as-a-service (SaaS) platform 25 that is accessed by users via their respective client computers 12.

Each of the client computers 12 includes one or more of a wide variety of electronic computing devices, including, for example, a personal computer, a mobile telephone (e.g., a smartphone), and a laptop. In some embodiments, one or more of the client computers 12 includes a computer system that is the same or similar to that of computer system 1000 described with regard to at least FIG. 12. Similarly, the server 16 includes one or more of a wide variety of electronic computing devices, including, for example, the above-mentioned devices, a general purpose computer, a blade server, a rack-mounted server, a network server, a Web server, and other types of servers. In some embodiments, the server 16 includes a computer system that is the same or similar to that of computer system 1000 described with regard to at least FIG. 12.

Each workflow is a computerized implementation of one or more tasks to be performed (e.g., by a manufacturer) to accomplish a predetermined objective (e.g., a manufacturing objective, a business objective, etc.). Each task of a workflow has one or more data inputs and computer-executable instructions that, when executed by the system 10, cause the computing system 10 to perform one or more actions based on the data inputs. Each workflow template 44 is a workflow in which at least one of the data inputs is a variable. Each workflow instance 28 is a workflow based on a corresponding workflow template 44. The workflow instance 28 is instantiated by the data fusion engine 20 based on user input 30 received via the user interface 14. When the workflow instance 28 is instantiated, a fixed data entry is assigned to at least one of the variable data inputs of the corresponding workflow template 44. The workflow instance 28 includes one or more tasks to be performed to accomplish a predetermined objective, and at least one status indicative of a status of one or more of the tasks. For example, a workflow template 44 may include a test workflow that includes a series of operations to be performed to test a non-flight type part. The operations may include, for example, instructions to hold the part under a given temperature and pressure ("A_temp" and "B_pressure") for a given duration ("C_duration), repeat hold for a given number of cycles ("D_cycles), and conduct ultrasonic testing (UT) of the part to identify any cracks of a given length ("E_length") or greater. When the workflow template 44 is associated with the part, a user may populate the workflow template 44 with test parameters that are appropriate for the part (e.g., A_temp=0 degrees Celsius; B_pressure=10,000 psi; C_duration=30 minutes; D_cycles=5; E_length=0.01 inch), to generate a corresponding workflow instance 28 for the part (e.g., that includes holding the part under 0 degrees Celsius and 10,000 psi for 30 minutes, repeating that hold for 5 cycles, and conducting UT of the part to identify any cracks of 0.01 inch or greater).

In some embodiments, a procedure instance includes or is otherwise defined by one or more workflow instances. For example, a procedure instance for a manufacturing process for creating a part (e.g., a process for creating a three dimensional (3D) printed part) may employ a workflow instance for forming the part (e.g., 3D printing to generate a rough version of the part), a workflow instance for refining the part (e.g., laser cutting the rough version of the part to generate a refined version of the part), and a workflow instance for finishing the part (e.g., polishing of the part to generate a finished version of the part). In such an embodiment, a procedure instance for creating the part may include the workflow instance for forming the part, the workflow instance for refining the part, and the workflow instance for finishing the part.

In some embodiments, a procedure template defines a basic structure of a corresponding procedure instance, including specifying a set of one or more workflows to be employed. Continuing with the above example, a procedure template for manufacturing the part may specify performance of (a) a first workflow for 3D printing of a part, (b) a second workflow for laser cutting of a part, and (c) a third workflow for polishing of a part. A corresponding procedure instance for manufacturing the part, generated based on the procedure template, may include (a) a populated version of the workflow for 3D printing of a part, (b) a populated version of the second workflow for laser cutting of a part, and (c) a populated version of the third workflow for polishing of a part. As described, each of the workflows may be populated with manufacturing parameters for the part.

In some embodiments, the one or more workflows of a procedure template are populated or otherwise defined based on corresponding workflow instances. Continuing with the above example, a first workflow instance that defines a populated first workflow for 3D printing of a part may be linked (or "logged") to a procedure instance for manufacturing the part (based on the first workflow of the procedure template), a second workflow instance that defines a populated second workflow for laser cutting of a part may be linked to the procedure instance for manufacturing the part (based on the second workflow of the procedure template), and a third workflow instance that defines a populated third workflow for polishing of a part may be linked to the procedure instance for manufacturing the part (based on the third workflow of the procedure template).

As described, the workflow instances of a procedure instance may be generated based on a workflow template that is populated with corresponding values. For example, the first workflow instance may be a workflow template for 3D printing of a part that is populated with corresponding parameters for 3D printing of the desired part (e.g., shape, material, temperature, layer height, and so forth), the second workflow instance may be a workflow template for laser cutting of a part that is populated with corresponding parameters for laser cutting of the desired part (e.g., laser power, cutting speed, pulse frequency, and so forth), and the third workflow instance may be a workflow template for polishing of a part that is populated with corresponding parameters for polishing the desired part (e.g., pressure, rotation speed, polishing time, and so forth).

A scope for a procedure template (or a "procedure scope") may define the types of items, such as different types of parts or workflows, that the given procedure template can be applied to. This may, for example, enable an unpopulated procedure to be created that defines a series of workflows, where a corresponding procedure scope is defined that limits the types of workflow instances that can be used to populate the procedure instances of the procedure template. Accordingly, where a procedure template has a procedure scope that only allows use of the procedure template for certain types of items, the workflows of the procedure template may be limited to being populated with workflow instances associated with corresponding types of items. Continuing with the above example, where the procedure template for manufacturing the part has a procedure scope that only allows use of the procedure template for manufacture of "flight" parts, the workflows of the procedure template may be limited to being populated with workflow instances associated with a corresponding "flight" parts scope (e.g., workflow instances generated from workflow templates associated with a "flight" part scope). Such a scoping technique may provide rules-based limitations and enforcement that ensure only compatible workflow instances are linked with a procedure template and, in turn, that procedure instances are populated with compatible workflows instances. In some embodiments, a procedure scope for a procedure template is selected using the scope selector 21 in a manner similar to that described with regard to selection of scope for workflow templates. Continuing with the above example, the scope selector 21 may display details of a given procedure template, such as a listing of workflows defining the procedure template, along with an option to select the type of parts, such as "flight" or "non-flight," to which the given procedure template can or cannot be associated with. The hierarchical data structure 22 can have various configurations. Referring to FIGS. 2-5C, in the illustrated embodiments, the parent node 24 of the hierarchical data structure 22 is defined by a parent directory 32, and each child node 26 is a data node in the form of a subdirectory, a file, a record, a field, a template, an instance, or another data object.

Referring to FIG. 2, the child nodes 26 include an inventory node 34, a parts library node 36, a test node 37, and a workflow node 38.

Figure 3A:
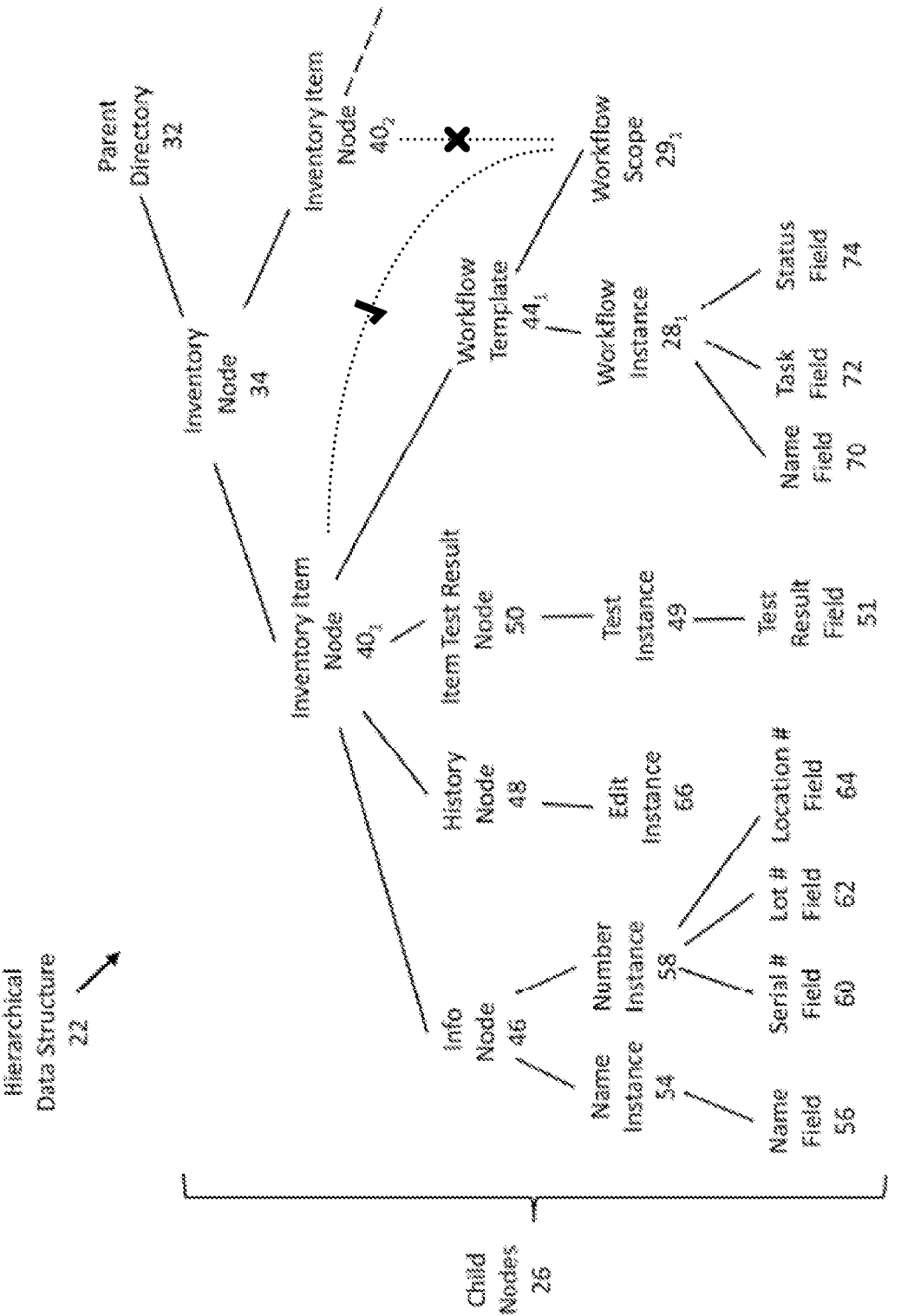
FIGS. 3A and 3B schematically illustrate portions of the hierarchical data structure of the database of FIG. 1.
Figure 3B:
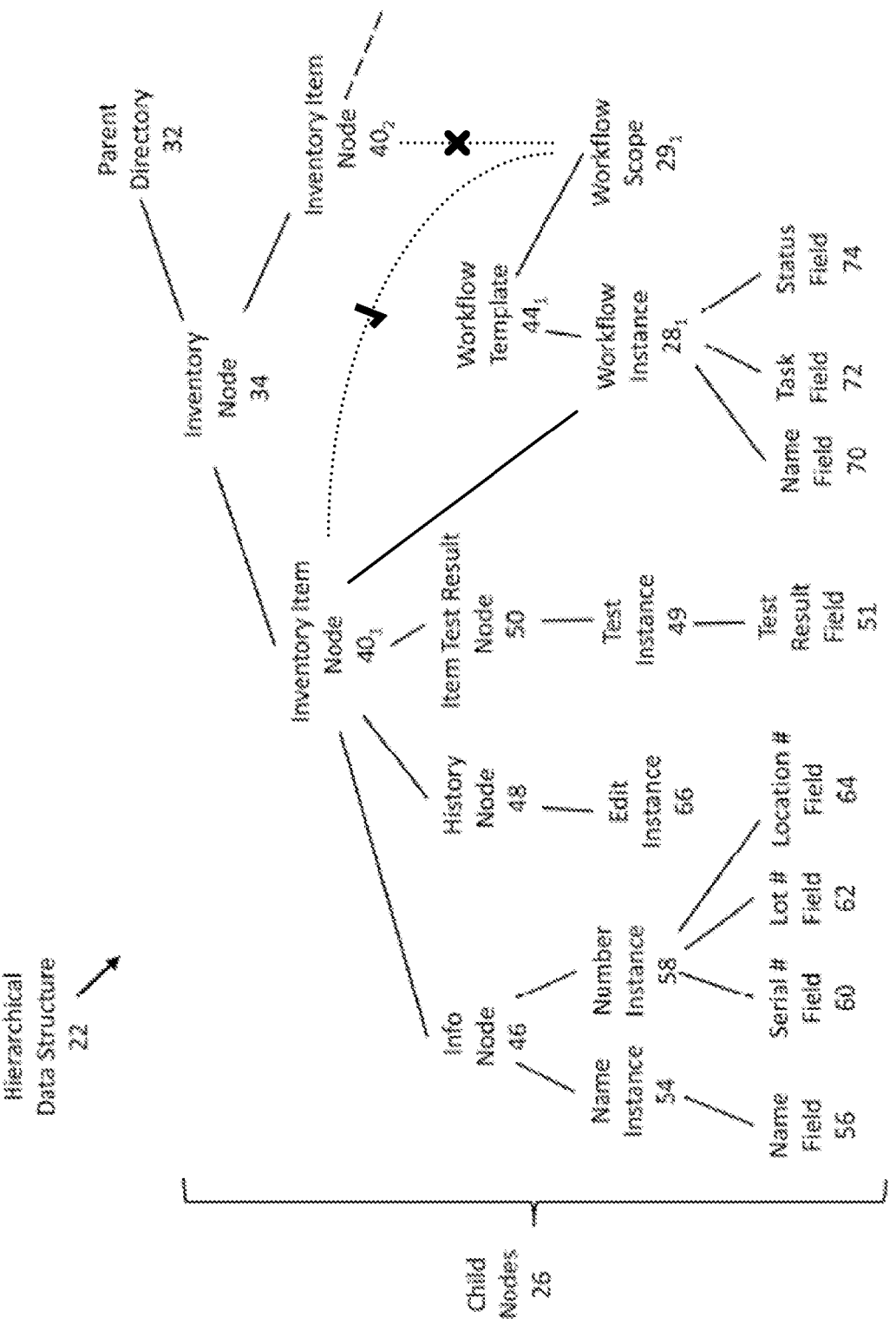

Referring to FIGS. 3A and 3B, the inventory node 34 is linked to a plurality of inventory item nodes 40, each, for example, corresponding to a respective real-world inventory item (e.g., a manufactured part, an assembly of several manufactured parts, a raw material to be used for manufacturing a part, etc., held in inventory). Referring to FIG. 3A, an inventory item node 40 is linked to a workflow template 44 that is linked to an associated workflow instance 28 and an associated workflow scope 29. Referring to FIG. 3B, an inventory item node 40 is linked to a workflow instance 28 linked or otherwise corresponding to a workflow template 44 and a workflow scope 29 linked thereto. As described, a workflow instance 28 may be linked to an inventory item node 40 where, for example, the workflow scope 29 associated with the workflow template 44 associated with the workflow instance 28 aligns with characteristics of the inventory item node 40 (e.g., the workflow scope 29 allows logging of the associated workflow template 44, and workflow instances 28 generated therefrom, to a node having the characteristics of the inventory item node 40).

Figure 4A:
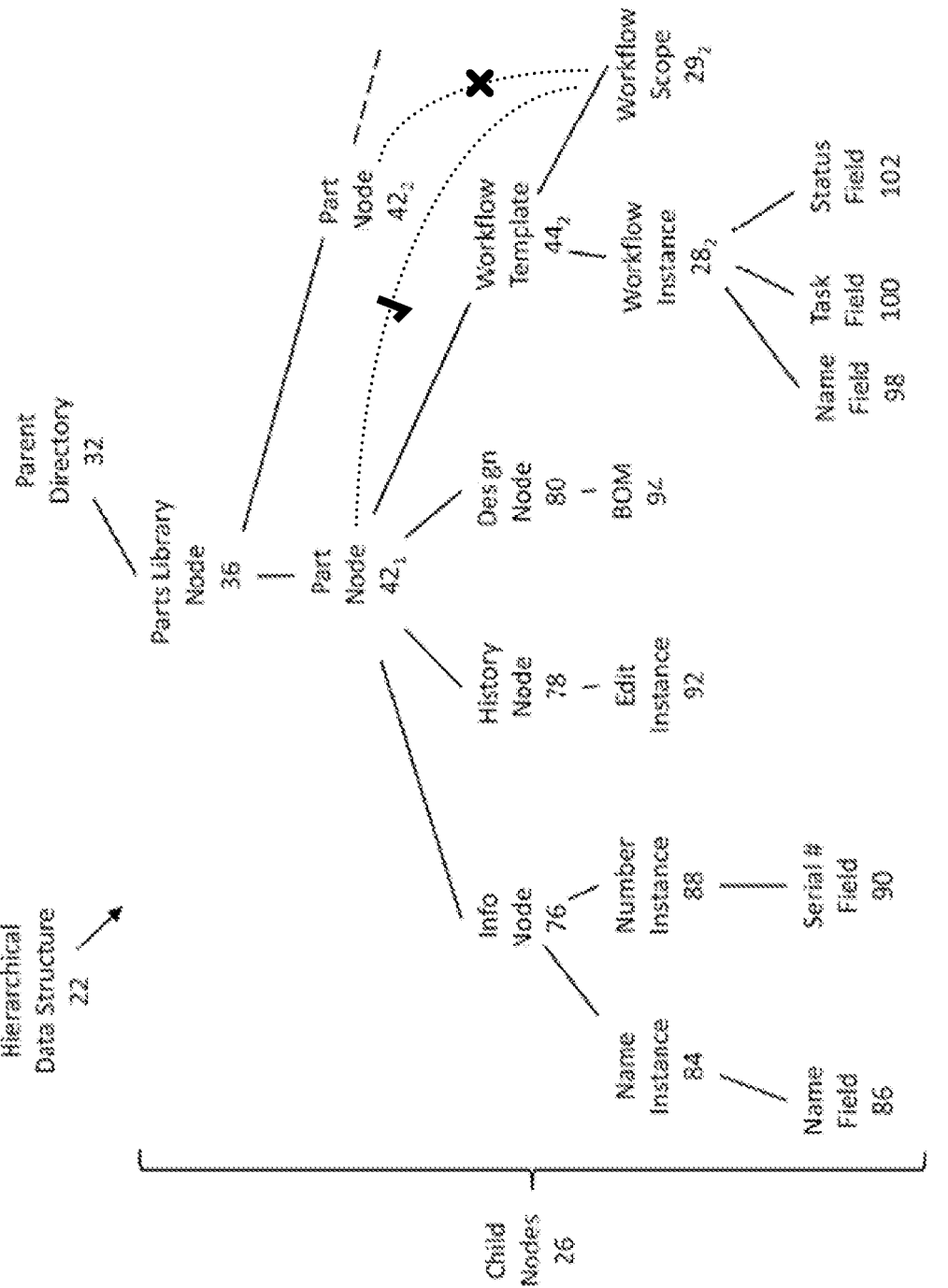
FIGS. 4A and 4B schematically illustrate portions of the hierarchical data structure of the database of FIG. 1.
Figure 4B:
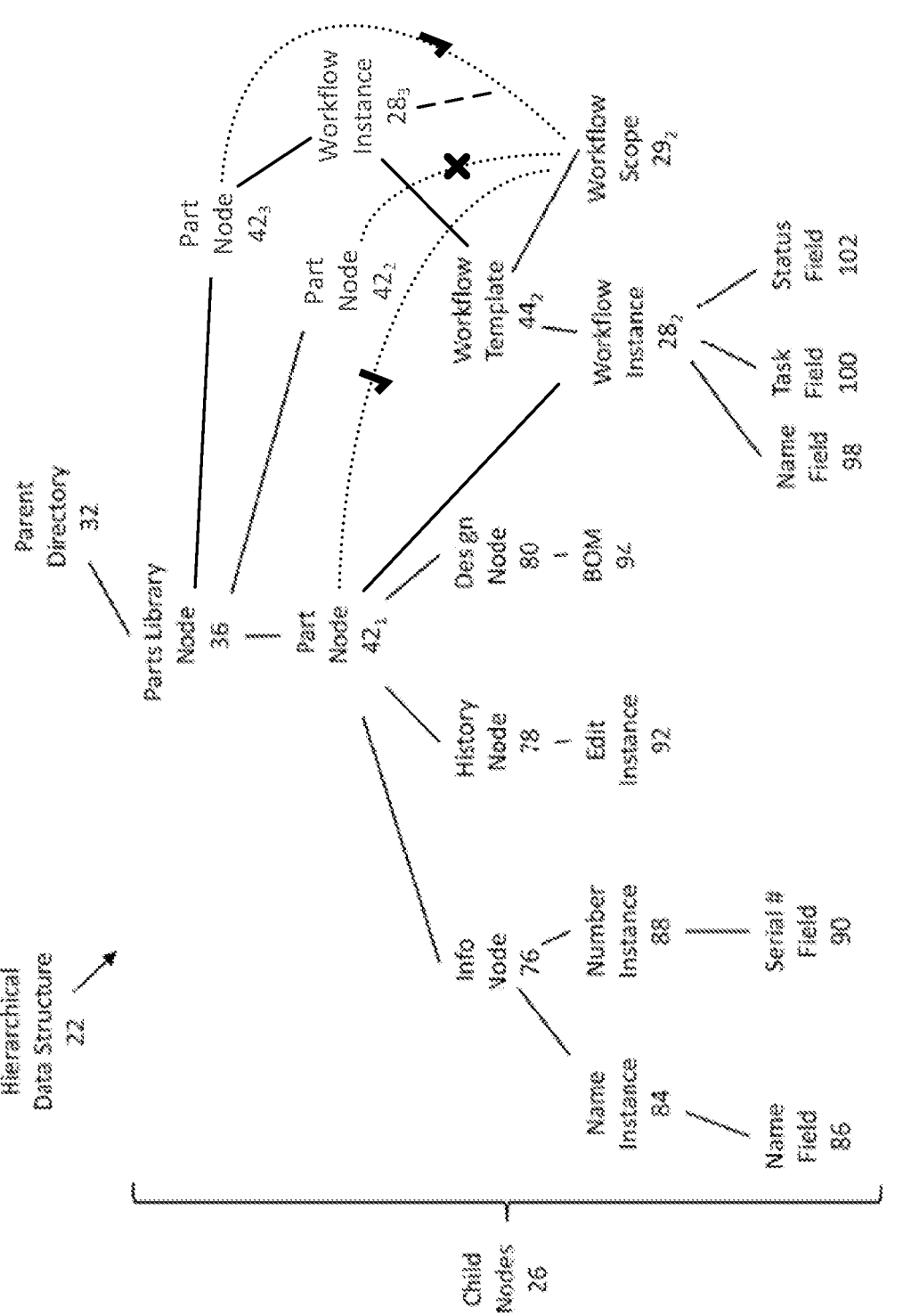

Referring to FIGS. 4A and 4B, the parts library node 36 is linked to a plurality of part nodes 42, each corresponding to a part to be manufactured. Referring to FIG. 4A, parts nodes 42 are linked to a workflow template 44 that is linked to an associated workflow instance 28 and an associated workflow scope 29. Referring to FIG. 4B, parts nodes 42 are linked to respective workflow instances 28 linked or otherwise corresponding to a workflow template 44 and a workflow scope 29 linked thereto. As described, a workflow instance 28 may be linked to a part node 42 where, for example, the workflow scope 29 associated with the workflow template 44 associated with the workflow instance 28 aligns with characteristics of the part node 42 (e.g., the workflow scope 29 allows logging of the associated workflow template 44, and workflow instances 28 generated therefrom, to a node having the characteristics of the part node 42).

Figure 5A:
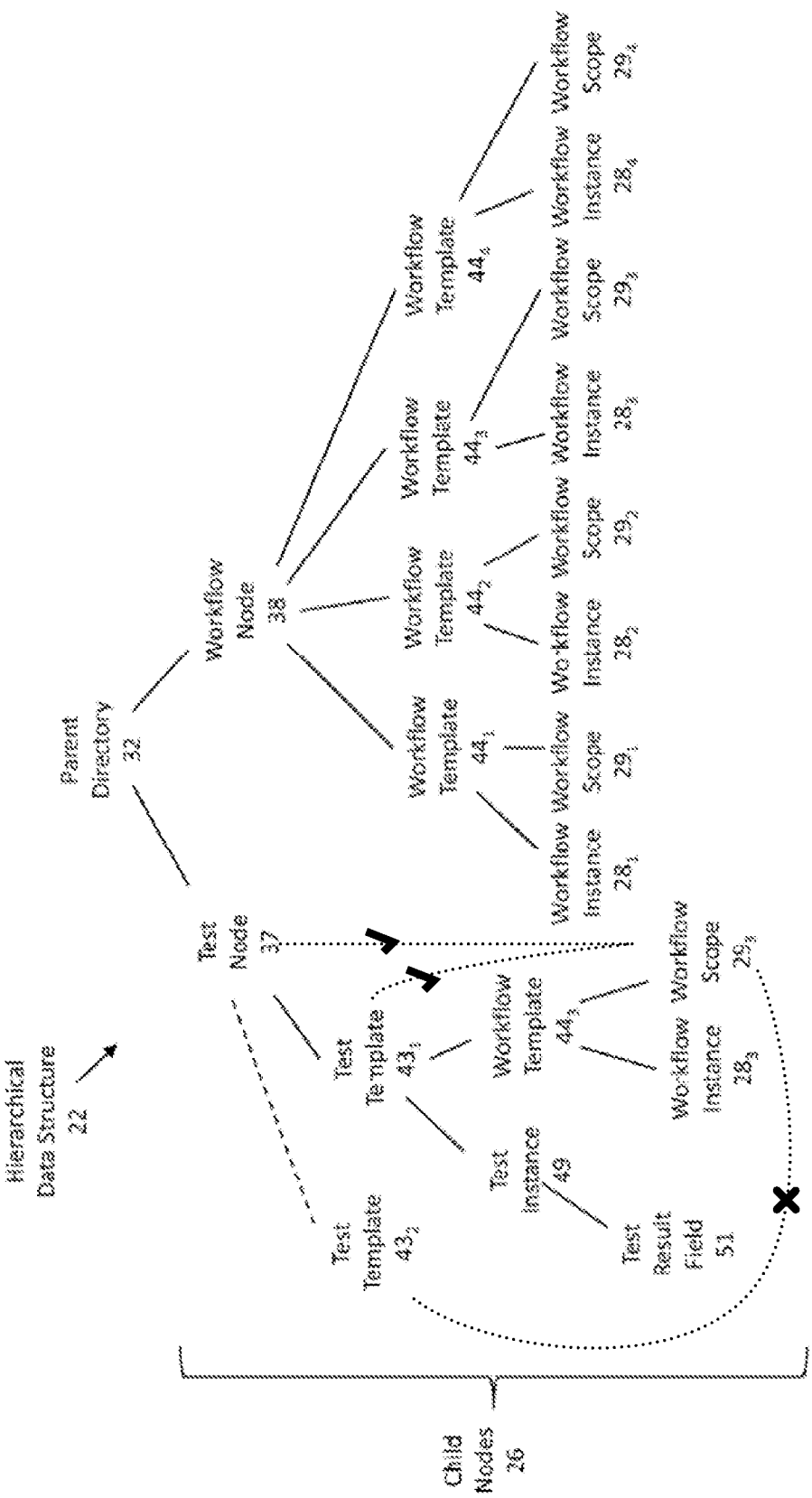
FIGS. 5A-5C schematically illustrate portions of the hierarchical data structure of the database of FIG. 1.
Figure 5B:
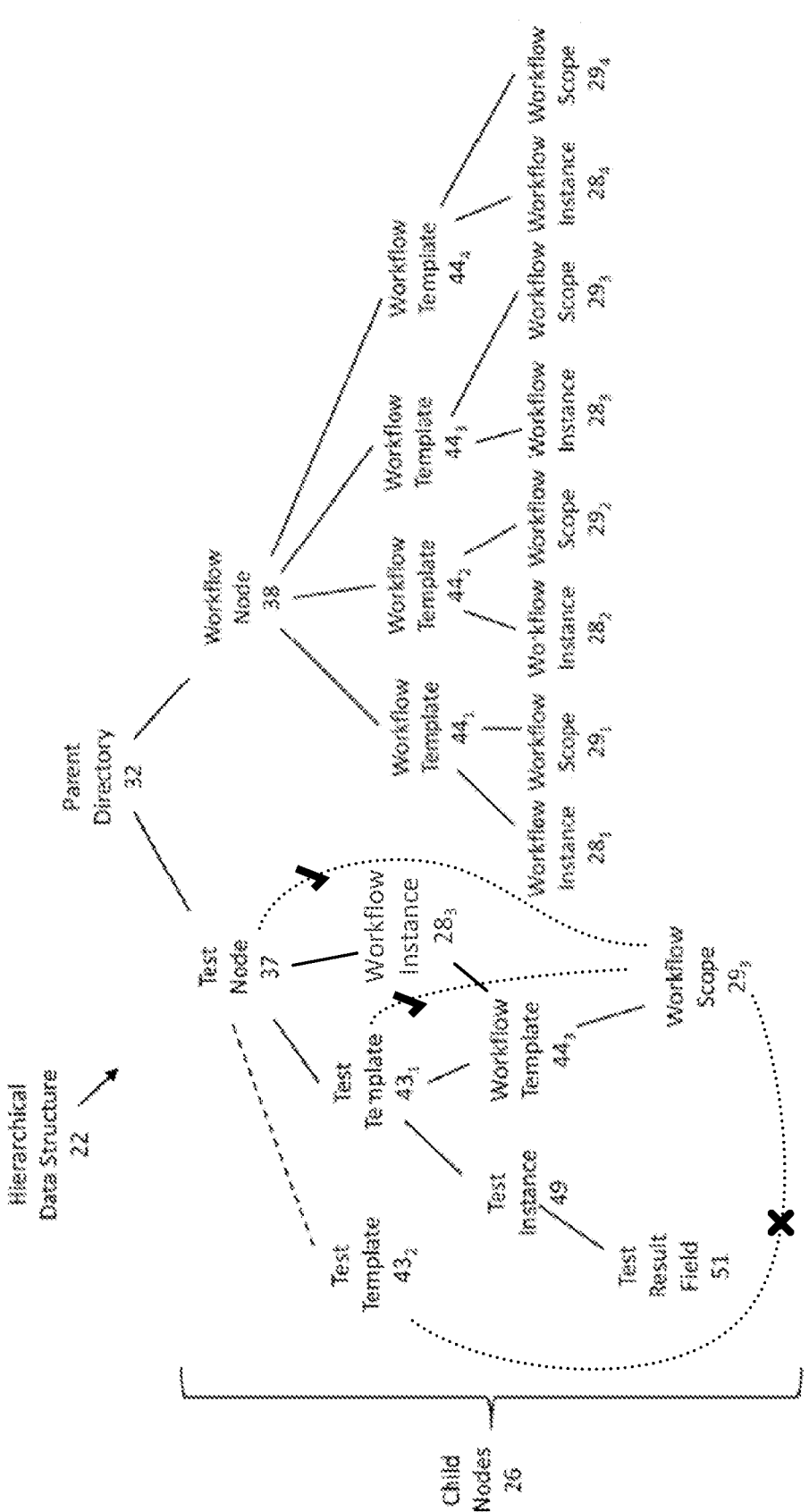

Referring to FIGS. 5A and 5B, the test node 37 is linked to a plurality of test templates 43, each corresponding to a test that can be performed on one or more inventory items and/or parts to be manufactured, for example. Referring to FIG. 5A, the test node 37 is linked to a test templates 43 linked to a workflow template 44 that is linked to an associated workflow instance 28 and an associated workflow scope 29. Referring to FIG. 5B, the test node 37 is linked to a workflow instance 28 linked or otherwise corresponding to a workflow template 44 and a workflow scope 29 linked thereto. Referring still to FIGS. 5A and 5B, the workflow node 38 is linked to a plurality of workflow templates 44 that are each linked to respective corresponding workflow templates 44 that are each linked to an associated workflow instance 28 and an associated workflow scope 29. As described, a workflow instance 28 may be linked to a workflow node 38 where, for example, the workflow scope 29 associated with the workflow template 44 associated with the workflow instance 28 aligns with characteristics of the workflow node 38 (e.g., the workflow scope 29 allows logging of the associated workflow template 44, and workflow instances 28 generated therefrom, to a node having the characteristics of the workflow node 38).

Figure 5C:
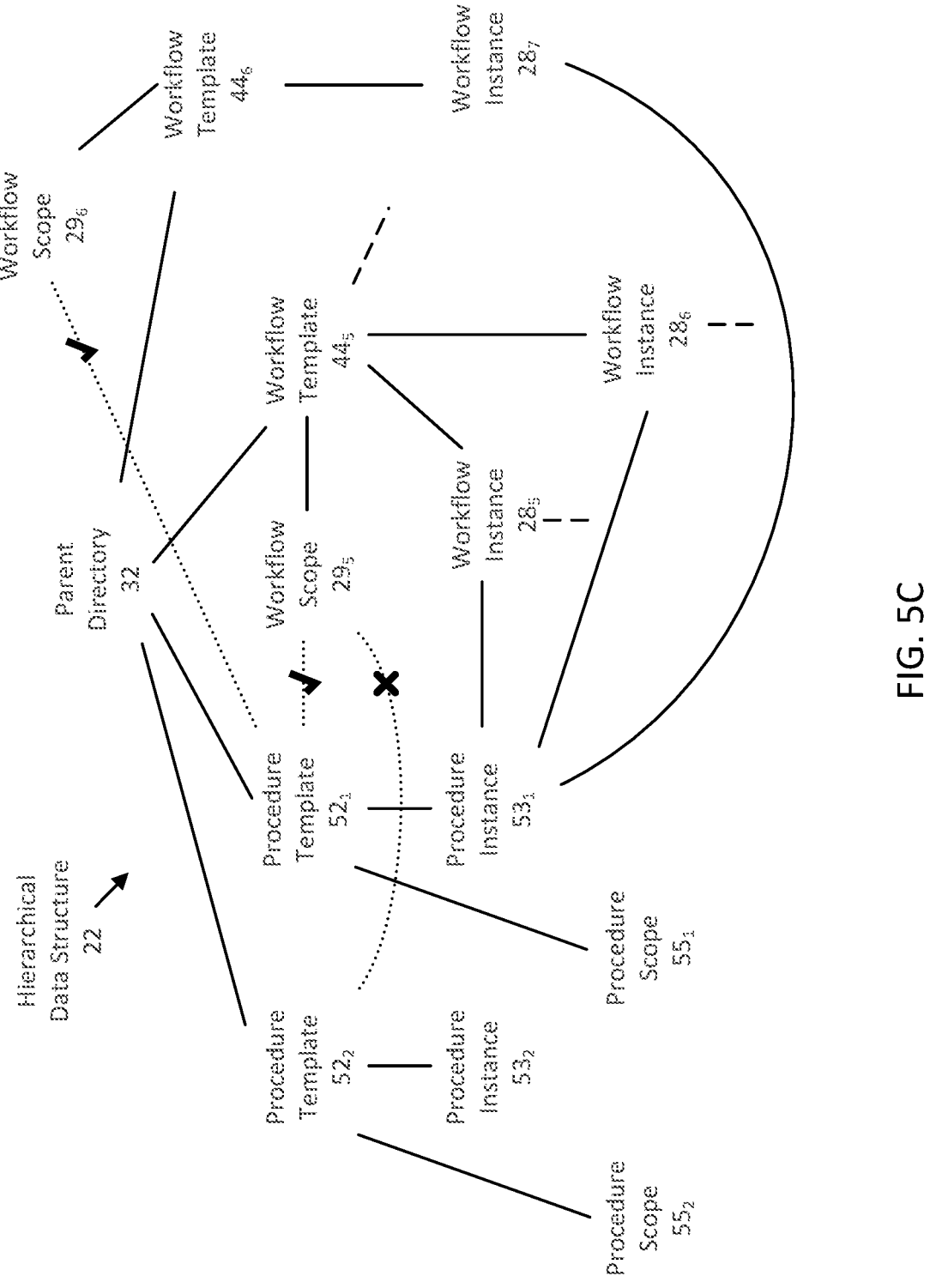

Referring to FIG. 5C, procedure templates 52 are linked to associated procedure instances 53 and procedure scopes 55, and workflow templates 44 are linked to associated workflow instances 28 and workflow scopes 29, with workflow instances 28 linked to a procedure instance. As described, a workflow instance 28 generated based on a workflow template 44 may be linked to a procedure instance 53 (e.g., the associated workflow may be included in the procedures of the procedure instance) where, for example, the workflow scope 29 associated with the workflow template 44 aligns with the procedure scope 55 associated with the procedure template 52 associated with the procedure instance 53.

Referring again to FIG. 2, in the illustrated embodiment, the hierarchical data structure 22 can be characterized as having a physical data domain 45 and a workflow data domain 47. The physical data domain 45 includes the inventory node 34, the parts library node 36, the test node 37, and the respective child nodes thereof, including inventory items 40, parts 42, and test templates 43. The workflow data domain 47 includes the workflow node 38 and the workflow templates 44 linked thereto, as well as procedure templates 52, which may, for example, incorporate one or more workflows generated based on workflow templates 44. In other embodiments, the system 10 includes more than one hierarchical data structure 22. In some such embodiments, a first hierarchical data structure includes the physical data domain 45 and a second hierarchical data structure includes the workflow data domain 47. In some such embodiments, the first and second hierarchical data structures can be saved to different databases that are in data communication with one another.

Referring to FIG. 3A, in the illustrated embodiment, the inventory node 34 includes a plurality of inventory item nodes 40 linked thereto. The first inventory item node $40_1$ includes an information node 46, a history node 48, an item test result node 50, and a workflow template $44_1$ linked thereto. The information node 46 includes a name instance 54 with a name field 56, and a number instance 58 with a serial number field 60, a lot number field 62, and a location number field 64. The history node 48 includes an edit instance 66. The item test result node 50 includes a test instance 49 with a test result field 51. The workflow template $44_1$ includes a workflow instance $28_1$ based on the workflow template $44_1$, and a workflow scope $29_1$. The first workflow instance $28_1$ includes a name field 70, at least one task field 72, and at least one status field 74. The second inventory item node $40_2$ (and other inventory item nodes (not shown in FIG. 3A)) can have a hierarchical data sub-structure that is at least substantially the same or different than that of the first inventory item node $40_1$.

As illustrated, the workflow instance $28_1$ may be indirectly linked to the first inventory item node $40_1$ by way of the workflow template $44_1$. The first inventory item node $40_1$ may be of a first node type, and the workflow scope $29_1$ may indicate that it is permissible to log (or "link") the workflow template $44_1$ to the first node type and/or the first inventory item node $40_1$. In such an embodiment, the workflow template $44_1$ (and/or the workflow instance $28_1$) may be linked to the first inventory item node $40_1$ responsive to a determination that the first inventory item node $40_1$ is a node that, according to the workflow scope $29_1$, can be logged (or "linked") to the workflow template $44_1$. For example, in response to receiving a user request to link the workflow template $44_1$ (and/or the workflow instance $28_1$) to the first inventory item node $40_1$, the data fusion engine 20 may assess the workflow scope $29_1$ associated with the workflow template $44_1$ to determine whether the workflow template $44_1$ (and/or the workflow instance $28_1$) can be associated with the first inventory item node $40_1$ (e.g., whether it can be linked with the first node type generally or the first inventory item node $40_1$ specifically). In response to determining that the workflow template $44_1$ (and/or the workflow instance $28_1$) can be associated with the first inventory item node $40_1$ (e.g., based on the workflow scope $29_1$ indicating that is it is permissible to link the workflow template $44_1$ (and/or the workflow instance $28_1$) to the first node type generally or the first inventory item node $40_1$ specifically), the data fusion engine 20 may link the workflow template $44_1$ (and/or the workflow instance $28_1$) with the inventory item node $40_1$. In some embodiments, this may include, in response to determining that the workflow template $44_1$ (and/or the workflow instance $28_1$) can be associated with the first inventory item node $40_1$, generating the workflow instance $28_1$ based on the workflow template $44_1$, and linking the workflow instance $28_1$ generated to the workflow template $44_1$, where the workflow template $44_1$ is linked to the first inventory item node $40_1$. In such an embodiment, the workflow instance $28_1$ may be linked to the workflow template $44_1$ based at least on the workflow instance $28_1$ being generated based on the workflow template $44_1$, and the workflow template $44_1$ may be directly linked to the first inventory item node $40_1$ based on the user request and a determination that the workflow template $44_1$ and/or the workflow instance $28_1$ can be linked to the first inventory item node $40_1$.

As described, embodiments may include directly linking a workflow instance with an associated node (such as an item node). This may be accomplished with or without intermediate linking of the workflow instance to its corresponding workflow template.

Referring to FIG. 3B, as illustrated, the workflow instance $28_1$ may be directly linked to the first inventory item node $40_1$. Similar to that described with regard to FIG. 3A, the first inventory item node $40_1$ may be of a first node type, and the workflow scope $29_1$ may indicate that it is permissible to link the workflow template $44_1$ to the first node type and/or the first inventory item node $40_1$. In such an embodiment, the workflow instance $28_1$ (and/or the workflow template $44_1$) may be linked to the first inventory item node $40_1$ responsive to a determination that the first inventory item node $40_1$ is a node that, according to the workflow scope $29_1$, can be linked to the workflow template $44_1$ (and/or a workflow instance associated therewith). For example, in response to receiving a user request to link the workflow template $44_1$ (and/or the workflow instance $28_1$) to the first inventory item node $40_1$, the data fusion engine 20 may assess the workflow scope $29_1$ associated with the workflow template $44_1$ to determine whether the workflow template $44_1$ (and/or the workflow instance $28_1$) can be associated with the first inventory item node $40_1$ (e.g., whether it can be linked with the first node type generally or the first inventory item node $40_1$ specifically). In response to determining that the workflow template $44_1$ (and/or the workflow instance $28_1$) can be associated with the first inventory item node $40_1$ (e.g., based on the workflow scope $29_1$ indicating that is it is permissible to link the workflow template $44_1$ (and/or the workflow instance $28_1$) to the first node type generally or the first inventory item node $40_1$ specifically), the data fusion engine 20 may link the workflow template $44_1$ (and/or the workflow instance $28_1$) with the first inventory item node $40_1$. In some embodiments, this may include, in response to determining that the workflow template $44_1$ (and/or the workflow instance $28_1$) can be associated with the first inventory item node $40_1$, generating the workflow instance $28_1$ based on the workflow template $44_1$, and directly linking the workflow instance $28_1$ generated to the first inventory item node $40_1$ and/or the workflow template $44_1$. In such an embodiment, the workflow instance $28_1$ may be linked to the workflow template $44_1$ based at least on the workflow instance $28_1$ being generated based on the workflow template $44_1$, and the workflow instance $28_1$ may be directly linked to the first inventory item node $40_1$ based on the user request and the determination that the workflow template $44_1$ and/or the workflow instance $28_1$ can be linked to the first inventory item node $40_1$.

In FIGS. 3A and 3B, the dotted lines and respective "check mark" and "X" respectively represent the workflow scope $29_1$ indicating that it is permissible to link the workflow template $44_1$ (and/or workflow instances generated therefrom, such as the workflow instance $28_1$) to the first node type and/or the first inventory item node $40_1$, and the workflow scope $29_1$ indicating that it is not permissible to link the workflow template $44_1$ (and/or workflow instances generated therefrom) to the second inventory item node $40_2$.

The workflow scope $29_1$ may, for example, indicate that it is permissible to link the workflow template $44_1$ to the first node type and/or the first inventory item node $40_1$. For example, the workflow scope $29_1$ may list the first node type and/or the first inventory item node $40_1$ as permitted for linking to the workflow template $44_1$ (and/or workflow instances generated therefrom, such as the workflow instance $28_1$), or the like.

The second inventory item node $40_2$ may be a second type of node, and the workflow scope $29_1$ may, for example, indicate that it is not permissible to link the workflow template $44_1$ to the second type of node and/or the second inventory item node $40_2$. For example, the workflow scope $29_1$ may not list the second type of node and/or the first inventory item node $40_1$ as permitted for linking to the workflow template $44_1$ (and/or workflow instances generated therefrom, such as the workflow instance $28_1$), may list the second type of node and/or the first inventory item node $40_1$, as not permitted for linking to the workflow template $44_1$ (and/or workflow instances generated therefrom, such as the workflow instance $28_1$), or the like. In such an embodiment, in response to receiving a user request to link the workflow template $44_1$ (and/or a workflow instance 28 therefrom) to the second inventory item node $40_2$, the data fusion engine 20 may assess the workflow scope $29_1$ associated with the workflow template $44_1$ to determine whether the workflow template $44_1$ (and/or a workflow instance 28 therefrom) can be associated with the second inventory item node $40_2$ (e.g., whether it can be linked with the second node type generally or the second inventory item node $40_2$ specifically). In response to determining that the workflow template $44_1$ (and/or a workflow instance 28 therefrom) cannot be associated with the second inventory item node $40_2$ (e.g., based on the workflow scope $29_1$ indicating that is it is not permissible to link the workflow template $44_1$ (and/or a workflow instance 28 therefrom) to the second node type generally or the second inventory item node $40_2$ specifically), the data fusion engine 20 may prohibit linking of the workflow template $44_1$ (and/or a workflow instance 28 therefrom) with the second inventory item node $40_2$.

Referring to FIG. 4A, in the illustrated embodiment, the parts library node 36 includes a plurality of part nodes 42 linked thereto. The first part node $42_1$ includes an information node 76, a history node 78, a design node 80, and a workflow template $44_2$ linked thereto. The information node 76 includes a name instance 84 with a name field 86, and a number instance 88 with a serial number field 90. The history node 78 includes an edit instance 92. The design node 80 includes a bill of material (BOM) 94. In other embodiments, the design node 80 additionally or alternatively includes another design file (e.g., a blueprint file, an engineering drawing file, etc.). The workflow template $44_2$ includes a second workflow instance $28_2$ based on the workflow template $44_2$, and a workflow scope $29_2$. The second workflow instance $28_2$ includes a name field 98, at least one task field 100, and at least one status field 102. The second part node $42_2$ and other part nodes (not shown in FIG. 4A) can have a hierarchical data sub-structure that is at least substantially the same or different than that of the first part node $42_1$.

As illustrated, the workflow instance $28_2$ may be indirectly linked to the first part node $42_1$ by way of the workflow template $44_2$. The first part node $42_1$ may be of a first node type, and the workflow scope $29_2$ may indicate that it is permissible to link the workflow template $44_2$ to the first node type and/or the first part node $42_1$. In such an embodiment, the workflow template $44_2$ (and/or the workflow instance $28_2$) may be linked to the first part node $42_1$ responsive to a determination that the first part node $42_1$ is a node that, according to the workflow scope $29_2$, can be linked to the workflow template $44_2$. For example, in response to receiving a user request to link the workflow template $44_2$ (and/or the workflow instance $28_2$) to the first part node $42_1$, the data fusion engine 20 may assess the workflow scope $29_2$ associated with the workflow template $44_2$ to determine whether the workflow template $44_2$ (and/or the workflow instance $28_2$) can be associated with the first part node $42_1$ (e.g., whether it can be linked with the first node type generally or the first part node $42_1$ specifically). In response to determining that the workflow template $44_2$ (and/or the workflow instance $28_2$) can be associated with the first part node $42_1$ (e.g., based on the workflow scope $29_2$ indicating that is it is permissible to link the workflow template $44_2$ (and/or the workflow instance $28_2$) to the first node type generally or the first part node $42_1$ specifically), the data fusion engine 20 may link the workflow template $44_2$ (and/or the workflow instance $28_2$) with the part node $42_1$. In some embodiments, this may include, in response to determining that the workflow template $44_2$ (and/or the workflow instance $28_2$) can be associated with the first part node $42_1$ generating the workflow instance $28_2$ based on the workflow template $44_2$, and linking the workflow instance $28_2$ generated to the workflow template $44_2$, where the workflow template $44_2$ is linked to the first part node $42_1$. In such an embodiment, the workflow instance $28_2$ may be linked to the workflow template $44_2$ based at least on the workflow instance $28_2$ being generated based on the workflow template $44_2$, and the workflow template $44_2$ may be directly linked to the first inventory item node $40_2$ based on the user request and a determination that the workflow template $44_2$ and/or the workflow instance $28_2$ can be linked to the first inventory part node $42_1$.

As described, embodiments may include directly linking a workflow instance with an associated node (such as a part node). This may be accomplished with or without intermediate linking of the workflow instance to its corresponding workflow template.

Referring to FIG. 4B, as illustrated, the workflow instance $28_2$ may be linked directly to the first part node $42_1$. Similar to that described with regard to FIG. 4A, the first inventory part node $42_1$ may be of a first node type, and the workflow scope $29_2$ may indicate that it is permissible to link the workflow template $44_2$ to the first node type and/or the first part node $42_1$. In such an embodiment, the workflow instance $28_2$ (and/or the workflow template $44_2$) may be linked to the first part node $42_1$ responsive to a determination that the first part node $42_1$ is a node that, according to the workflow scope $29_2$, can be linked to the workflow template $44_2$ (and/or a workflow instance associated therewith). For example, in response to receiving a user request to link the workflow template $44_2$ (and/or the workflow instance $28_2$) to the first part node $42_1$, the data fusion engine 20 may assess the workflow scope $29_2$ associated with the workflow template $44_2$ to determine whether the workflow template $44_2$ (and/or the workflow instance $28_2$) can be associated with the node type of the first part node $42_1$ (e.g., whether it can be linked with the first node type or first part node $42_1$ specifically). In response to determining that the workflow template $44_2$ (and/or the workflow instance $28_2$) can be associated with the first part node $42_1$ (e.g., based on the workflow scope $29_2$ indicating that is it is permissible to link the workflow template $44_2$ (and/or the workflow instance $28_2$) to the first node type generally or the first part node $42_1$ specifically), the data fusion engine 20 may link the workflow template $44_2$ (and/or the workflow instance $28_2$) with the first part node $42_1$. In some embodiments, this may include, in response to determining that the workflow template $44_2$ (and/or the workflow instance $28_2$) can be associated with the first part node $42_1$, generating the workflow instance $28_2$ based on the workflow template $44_2$, and directly linking the workflow instance $28_2$ generated to the first part node $42_1$ and/or the workflow template $44_2$. In such an embodiment, the workflow instance $28_2$ may be linked to the workflow template $44_2$ based at least on the workflow instance $28_2$ being generated based on the workflow template $44_2$, and the workflow instance $28_2$ may be directly linked to the first inventory item node $40_2$ based on the user request and the determination that the workflow template $44_2$ and/or the workflow instance $28_2$ can be linked to the first part node $42_1$.

In FIGS. 4A and 4B, the dotted lines and respective "check marks" and "X" respectively represent the workflow scope $29_2$ indicating that it is permissible to link the workflow template $44_2$ (and/or workflow instances generated therefrom, such as the workflow instance $28_2$ and/or the workflow instance $28_3$) to the first node type and/or the first part node $42_1$ and/or the third part node 423, and represent the workflow scope $29_2$ indicating that it is not permissible to link the workflow template $44_2$ (and/or workflow instances generated therefrom) to the second part node $42_2$.

The workflow scope $29_2$ may, for example, indicate that it is permissible to link the workflow template $44_2$ to the first node type, the first part node $42_1$ and/or the third part node 423. For example, the workflow scope $29_2$ may list the first node type, the first part node $42_1$ and/or the third part node 423, as permitted for linking to the workflow template $44_2$ (and/or workflow instances generated therefrom, such as the workflow instance $28_2$ and/or the workflow instance $28_3$), or the like.

The second part node $42_2$ may be a second type of node, and the workflow scope $29_2$ may, for example, indicate that it is not permissible to link the workflow template $44_2$ to the second type of node and/or the second part node $42_2$. For example, the workflow scope $29_2$ may not list the second type of node, the first part node $42_1$ and/or the third part node 423 as permitted for linking to the workflow template $44_2$ (and/or workflow instances generated therefrom), may list the second type of node, the first part node $42_1$ and/or the third part node 423 as not permitted for linking to the workflow template $44_2$ (and/or workflow instances generated therefrom), or the like. In such an embodiment, in response to receiving a user request to link the workflow template $44_2$ (and/or a workflow instance 28) to the second part node $42_2$, the data fusion engine 20 may assess the workflow scope $29_2$ associated with the workflow template $44_2$ to determine whether the workflow template $44_2$ (and/or a workflow instance 28 therefrom) can be associated with the node type of the second part node $42_2$ (e.g., whether it can be linked with the second node type or second part node $42_2$ specifically). In response to determining that the workflow template $44_2$ (and/or a workflow instance 28 therefrom) cannot be associated with the second part node $42_2$ (e.g., based on the workflow scope $29_2$ indicating that is it is not permissible to link the workflow template $44_2$ (and/or a workflow instance 28 therefrom) to the second node type generally or the second part node $42_2$ specifically), the data fusion engine 20 may prohibit linking of the workflow template $44_2$ (and/or a workflow instance 28 therefrom) with the second part node $42_2$.

Referring to FIG. 5A, in the illustrated embodiment, the test node 37 includes a plurality of test templates 43 linked thereto. The first test template $43_1$ includes a test instance 49 and a workflow template $44_3$ linked thereto. The test instance 49 includes a test result field 51 linked thereto. The test instance 49 and test result field 51 are also logged to the item test result node 50 of the first inventory item node $40_1$, as described above in reference to FIG. 3A. The workflow template $44_3$ includes a workflow instance $28_3$ and workflow scope $29_3$. The second test template $43_2$ and other test templates not shown in FIG. 5 can have a hierarchical data sub-structure that is at least substantially the same or different than that of the first test template $43_1$.

Referring still to FIG. 5A, in some embodiments, the workflow node 38 includes at least the workflow templates $44_1$, $44_2$, $44_3$ logged to the child nodes 26 in the physical data domain 45 (see FIG. 2). The workflow node 38 further includes at least the respective workflow instances $28_1$, $28_2$, $28_3$ linked to those workflow templates $44_1$, $44_2$, $44_3$. In some embodiments, the workflow node 38 further includes one or more additional workflow templates $44_4$ and workflow instances $28_4$ that are not logged to the child nodes 26 in the physical data domain 45.

As illustrated, the workflow instance $28_3$ may be indirectly linked to the first test template $43_1$ and/or test node 37 by way of the workflow template $44_3$. The first test template $43_1$ and/or test node 37 may be of a first node type, and the workflow scope $29_3$ may indicate that it is permissible to link the workflow template $44_3$ to the first node type and/or the first test template $43_1$ and/or test node 37. In such an embodiment, the workflow template $44_3$ (and/or the workflow instance $28_3$) may be linked to the first test template $43_1$ and/or test node 37 responsive to a determination that the first test template $43_1$ and/or test node 37 is a node that, according to the workflow scope $29_3$, can be linked to the workflow template $44_3$. For example, in response to receiving a user request to link the workflow template $44_3$ (and/or the workflow instance $28_3$) to the first test template $43_1$ and/or test node 37, the data fusion engine 20 may assess the workflow scope $29_3$ associated with the workflow template $44_3$ to determine whether the workflow template $44_3$ (and/or the workflow instance $28_3$) can be associated with the first test template $43_1$ and/or test node 37 (e.g., whether it can be linked with the first node type generally or the first test template $43_1$ and/or test node 37 specifically). In response to determining that the workflow template $44_3$ (and/or the workflow instance $28_3$) can be associated with the first test template $43_1$ and/or test node 37 (e.g., based on the workflow scope $29_3$ indicating that is it is permissible to link the workflow template $44_3$ (and/or the workflow instance $28_3$) to the first node type generally or the first test template $43_1$ and/or test node 37 specifically), the data fusion engine 20 may link the workflow template $44_3$ (and/or the workflow instance $28_3$) with the first test template $43_1$ and/or test node 37. In some embodiments, this may include, in response to determining that the workflow template $44_3$ (and/or the workflow instance $28_3$) can be associated with the first test template $43_1$ and/or test node 37 generating the workflow instance $28_3$ based on the workflow template $44_3$, and linking the workflow instance $28_3$ generated to the workflow template $44_3$, where the workflow template $44_2$ is linked to the first test template $43_1$ and/or test node 37. In such an embodiment, the workflow instance $28_3$ may be linked to the workflow template $44_3$ based at least on the workflow instance $28_3$ being generated based on the workflow template $44_3$, and the workflow template $44_3$ may be directly linked to the first test template $43_1$ and/or test node 37 based on the user request and a determination that the workflow template $44_3$ and/or the workflow instance $28_3$ can be linked to the first test template $43_1$ and/or the test node 37.

As described, embodiments may include directly linking a workflow instance with an associated node (such as a test template node and/or test node). This may be accomplished with or without intermediate linking of the workflow instance to its corresponding workflow template.

Referring to FIG. 5B, as illustrated, the workflow instance $28_3$ may be linked directly to the first test template $43_1$ and/or test node 37. Similar to that described with regard to FIG. 5A, the first test template $43_1$ and/or test node 37 may be of a first node type, and the workflow scope $29_3$ may indicate that it is permissible to link the workflow template $44_3$ to the first node type and/or to the first test template $43_1$ and/or test node 37. In such an embodiment, the workflow instance $28_3$ (and/or the workflow template $44_3$) may be linked to the first test template $43_1$ and/or test node 37 responsive to a determination that the first test template $43_1$ and/or test node 37 is a node that, according to the workflow scope $29_3$, can be linked to the workflow template $44_3$ (and/or a workflow instance associated therewith). For example, in response to receiving a user request to link the workflow template $44_3$ (and/or the workflow instance $28_3$) to the first test template $43_1$ and/or test node 37, the data fusion engine 20 may assess the workflow scope $29_3$ associated with the workflow template $44_3$ to determine whether the workflow template $44_3$ (and/or the workflow instance $28_3$) can be associated with the node type of the first test template $43_1$ and/or test node 37 (e.g., whether it can be linked with the first node type or the first test template $43_1$ and/or test node 37 specifically). In response to determining that the workflow template $44_3$ (and/or the workflow instance $28_3$) can be associated with the first test template $43_1$ and/or test node 37 (e.g., based on the workflow scope $29_3$ indicating that is it is permissible to link the workflow template $44_3$ (and/or the workflow instance $28_3$) to the first node type generally or to the first test template $43_1$ and/or test node 37 specifically), the data fusion engine 20 may link the workflow template $44_3$ (and/or the workflow instance $28_3$) with the first test template $43_1$ and/or test node 37. In some embodiments, this may include, in response to determining that the workflow template $44_3$ (and/or the workflow instance $28_3$) can be associated with the first test template $43_1$ and/or test node 37, generating the workflow instance $28_3$ based on the workflow template $44_3$, and directly linking the workflow instance $28_3$ generated to the first test template $43_1$ and/or test node 37 and/or to the workflow template $44_2$. In such an embodiment, the workflow instance $28_3$ may be linked to the workflow template $44_3$ based at least on the workflow instance $28_3$ being generated based on the workflow template $44_3$, and the workflow instance $28_3$ may be directly linked to the first test template $43_1$ and/or test node 37 based on the user request and the determination that the workflow template $44_3$ and/or the workflow instance $28_3$ can be linked to the first test template $43_1$ and/or test node 37.

In FIGS. 5A and 5B, the dotted lines and respective "check marks" and "X" respectively represent the workflow scope $29_3$ indicating that it is permissible to link the workflow template $44_3$ (and/or workflow instances generated therefrom, such as the workflow instance $28_3$) to the first node type and/or the first test template $43_1$ and/or test node 37, and represent the workflow scope $29_3$ indicating that it is not permissible to link the workflow template $44_3$ (and/or workflow instances generated therefrom) to the second test template $43_2$.

The workflow scope $29_3$ may, for example, indicate that it is permissible to link the workflow template $44_3$ to the first node type, the first test template $43_1$ and/or test node 37. For example, the workflow scope $29_3$ may list the first node type, the first test template $43_1$ and/or test node 37, as permitted for linking to the workflow template $44_3$ (and/or workflow instances generated therefrom, such as the workflow instance $28_3$), or the like.

The second test template $43_2$ may be a second type of node, and the workflow scope $29_3$ may, for example, indicate that it is not permissible to link the workflow template $44_3$ to the second type of node and/or the second test template $43_2$. For example, the workflow scope $29_3$ may not list the second type of node or the second test template $43_2$ as permitted for linking to the workflow template $44_3$ (and/or workflow instances generated therefrom), may list the second type of node or the second test template $43_2$ as not permitted for linking to the workflow template $44_3$ (and/or workflow instances generated therefrom), or the like. In such an embodiment, in response to receiving a user request to link the workflow template $44_3$ (and/or a workflow instance 28 generated therefrom) to the second test template $43_2$, the data fusion engine 20 may assess the workflow scope $29_3$ associated with the workflow template $44_3$ to determine whether the workflow template $44_3$ (and/or a workflow instance 28 generated therefrom) can be associated with the node type of the second test template $43_2$ (e.g., whether it can be linked with the second node type or the second test template $43_2$ specifically). In response to determining that the workflow template $44_3$ (and/or a workflow instance 28 generated therefrom) cannot be associated with the second test template $43_2$ (e.g., based on the workflow scope $29_3$ indicating that is it is not permissible to link the workflow template $44_3$ (and/or a workflow instance 28 generated therefrom) to the second node type generally or to the second test template $43_2$ specifically), the data fusion engine 20 may prohibit linking of the workflow template $44_3$ (and/or a workflow instance 28 generated therefrom) with the second test template $43_2$.

As described, embodiments may include directly linking a workflow instance with an associated node (such as a procedure instance). This may be accomplished with or without intermediate linking of the workflow instance to its corresponding workflow template.

Referring to FIG. 5C, as illustrated, the workflow instances $28_5$, $28_6$, and $28_7$ may be linked directly to the procedure instance $53_1$. The procedure instance $53_1$ may be linked to a corresponding procedure template $52_1$ that is linked to a corresponding procedure scope $55_1$. The workflow instances $28_5$ and $28_6$ may be linked directly to the workflow template $44_5$ (that is linked to a corresponding workflow scope $29_5$) and the workflow instance $28_7$ may be linked directly to the workflow template $44_6$ (that is linked to a corresponding workflow scope $29_6$). The workflow scope $29_5$ may indicate that it is permissible to link the workflow template $44_5$ (and/or a workflow instance associated therewith) with a first node type (e.g., flight part type), the workflow scope $29_6$ may indicate that it is permissible to link the workflow template $44_6$ (and/or a workflow instance associated therewith) with a first node type (e.g., flight part type), and the procedure scope $55_1$ may indicate that it is permissible to link the procedure template $52_1$ (and/or a procedure instance associated therewith) with a first node type (e.g., flight part type). In such an embodiment, the workflow instances $28_5$ and $28_6$ may be linked to the procedure instance $53_1$ responsive to a determination that the procedure scope $55_1$ aligns with the workflow scope $29_5$, and the workflow instance $28_7$ may be linked to the procedure instance $53_1$ responsive to a determination that the procedure scope $55_1$ aligns with the workflow scope $29_6$. For example, in response to receiving a user request to link the workflow instance $28_5$) to the procedure instance $53_1$, the data fusion engine 20 may assess whether the procedure scope $55_1$ aligns with the workflow scope $29_5$ (e.g., whether the procedure scope $55_1$ indicates that the type of workflow scope $29_5$ is allowed). In response to determining that the procedure scope $55_1$ aligns with the workflow scope $29_5$ (e.g., based on the procedure scope $55_1$ indicating that the type of workflow scope $29_5$ is allowed), the data fusion engine 20 may link the workflow instance $28_5$ with the procedure instance $53_1$. In some embodiments, this may include, in response to determining the procedure scope $55_1$ aligns with the workflow scope $29_5$, linking the workflow instance $28s$ to the procedure instance $53_1$, such that a corresponding workflow of the procedure instance $53_1$ is populated with the workflow instance $28_5$. Such a process may be repeated for each of workflow instance $28_6$ and workflow instance $28_7$. Continuing with an above example, the procedure template $52_1$ may be a template for manufacturing a part that specifies performance of a first workflow for 3D printing of a part, a second workflow for laser cutting of a part, and a third workflow for polishing of a part. The procedure instance $53_1$ may be a corresponding procedure instance for manufacturing the part, generated based on the procedure template $52_1$. The workflow instance $28_5$ may be a first workflow instance that defines a populated first workflow for 3D printing of a part, the workflow instance $28_6$ may be a second workflow instance that defines a populated second workflow for laser cutting of a part, and the workflow instance $28_7$ may be a third workflow instance that defines a populated third workflow for polishing of a part, that together define a print/cut/polish procedure for manufacturing the part.

In FIG. 5C, the dotted lines and respective "check marks" and "X" respectively represent the procedure scope $55_1$ aligning with the workflow scope $29_5$ and the workflow scope $29_6$, thereby indicating that it is permissible to link workflow instances generated using workflow template $44_5$ and $44_6$, including the workflow instances $28_5$, $28_6$, and $28_7$, to the procedure instance $53_1$, and represent the procedure scope $55_2$ not aligning with the workflow scope $29_5$, thereby indicating that it is not permissible to link workflow instances generated using workflow template $44_5$, including the workflow instances $28_5$ and $28_6$, to the procedure instance $53_2$.

The procedure scope $55_1$ may, for example, indicate that it is permissible to link the procedure template $52_1$ (and/or procedure instances 53 generated therefrom, such as the procedure instance $53_1$) to a first node type that is indicated as permissible by the workflow scope $29_5$, to the workflow template $44_5$ and/or the workflow template $44_6$, and/or to some or all of the workflow instance $28_5$, $28_6$, and/or $28_7$. For example, the procedure template $52_1$ may list the first node type, the workflow template $44_5$ and/or the workflow template $44_6$, and/or some or all of the workflow instance $28_5$, $28_6$, and/or $28_7$, as permitted for linking to the procedure template $52_1$ (and/or workflow instances generated therefrom, such as the procedure instance $53_1$), or the like.

The procedure scope $55_2$ may, for example, indicate that it is not permissible to link the procedure template $52_2$ (and/or procedure instances 53 generated therefrom, such as the procedure instance $53_2$) to a first node type that is indicated as permissible by the workflow scope $29_5$, to the workflow template $44_5$ and/or the workflow template $44_6$, and/or to some or all of the workflow instance $28_5$, $28_6$, and/or $28_7$. For example, the procedure template $52_2$ may list the first node type, the workflow template $44_5$ and/or the workflow template $44_6$, and/or some or all of the workflow instance $28_5$, $28_6$, and/or $28_7$, as not permitted for linking to the procedure template $52_2$ (and/or workflow instances generated therefrom, such as the procedure instance $53_2$), or the like. In such an embodiment, in response to receiving a user request to link the workflow instance $28_5$) to the procedure instance $53_2$, the data fusion engine 20 may assess whether the procedure scope $55_2$ aligns with the workflow scope $29_5$ (e.g., whether the procedure scope $55_2$ indicates that the type of workflow scope $29_5$ is allowed). In response to determining that the procedure scope $55_2$ does not align with the workflow scope $29_5$ (e.g., based on the procedure scope $55_2$ indicating that the type of workflow scope $29_5$ is not allowed), the data fusion engine 20 may prohibit linking of the workflow instance $28_5$ with the procedure instance $53_2$. Referring again to FIG. 1, the data fusion engine 20 is configured to create data (including the workflow templates 44, workflow instances 28, and workflow scopes 29) and log the created data to the hierarchical data structure 22 based on user input 30 received via the user interface 14. The data fusion engine 20 is also configured to edit data (including the workflow templates 44, workflow instances 28, and work-flow scopes 29) already logged to the hierarchical data structure 22, based on user input 30 received via the user interface 14. In some embodiments, the user input 30 is a no-code input or a low-code input.

In the illustrated embodiment, the data fusion engine 20 is configured to create and log workflows (e.g., workflow templates 44 and workflow instances 28) to child nodes 26 that are linked to (e.g., descendent from) the inventory node 34, the parts library node 36, the test node 37, and the workflow node 38. Notably, the data fusion engine 20 is configured to log workflows to at least one leaf node (i.e., a child node 26 without any descendant child nodes linked thereto). Referring to FIG. 5, for example, the first test template 43₁ defined a leaf node until the data fusion engine 20 logged the workflow template 44₃ and the test instance 49 to the first test template 43₁.

In some embodiments, the data fusion engine 20 includes a rules engine that is operable to monitor the one or more workflows logged to the child nodes 26 and detect a change in the status of a task associated with the one or more workflows (a "workflow task"). In some such cases, the data fusion engine 20 is configured to execute one or more rules-based actions in response to detecting a change in the status of a workflow task. Such actions can include, for example, instantiating and/or executing another workflow instance based on a same or different workflow template, generating and/or transmitting an approval request (e.g., a signoff request) to one or more users of the system 10, etc.

In some embodiments, the data fusion engine 20 is configured to automatically log a history of all changes that occur to the data and/or data objects in the hierarchical data structure 22, including changes involving workflow templates 44 and workflow instances 28. In some embodiments, the child nodes 26 include at least first and second sibling nodes (i.e., child nodes with a common ancestor node), and the data fusion engine 20 is configured to log to the first sibling node a history of all changes to data in the second sibling node. Referring to FIG. 3, for example, the first inventory item node 40₁ includes a history node 48 to which the data fusion engine 20 automatically logs a history of all changes to the information node 46, the item test result node 50, the workflow template 44₁, and the child nodes 26 descendent therefrom. In the illustrated embodiment, the history node 48 includes a single edit instance 66 to which all changes are logged. In other embodiments, the data fusion engine 20 is configured to create a new edit instance each time a new change occurs.

Figure 6:
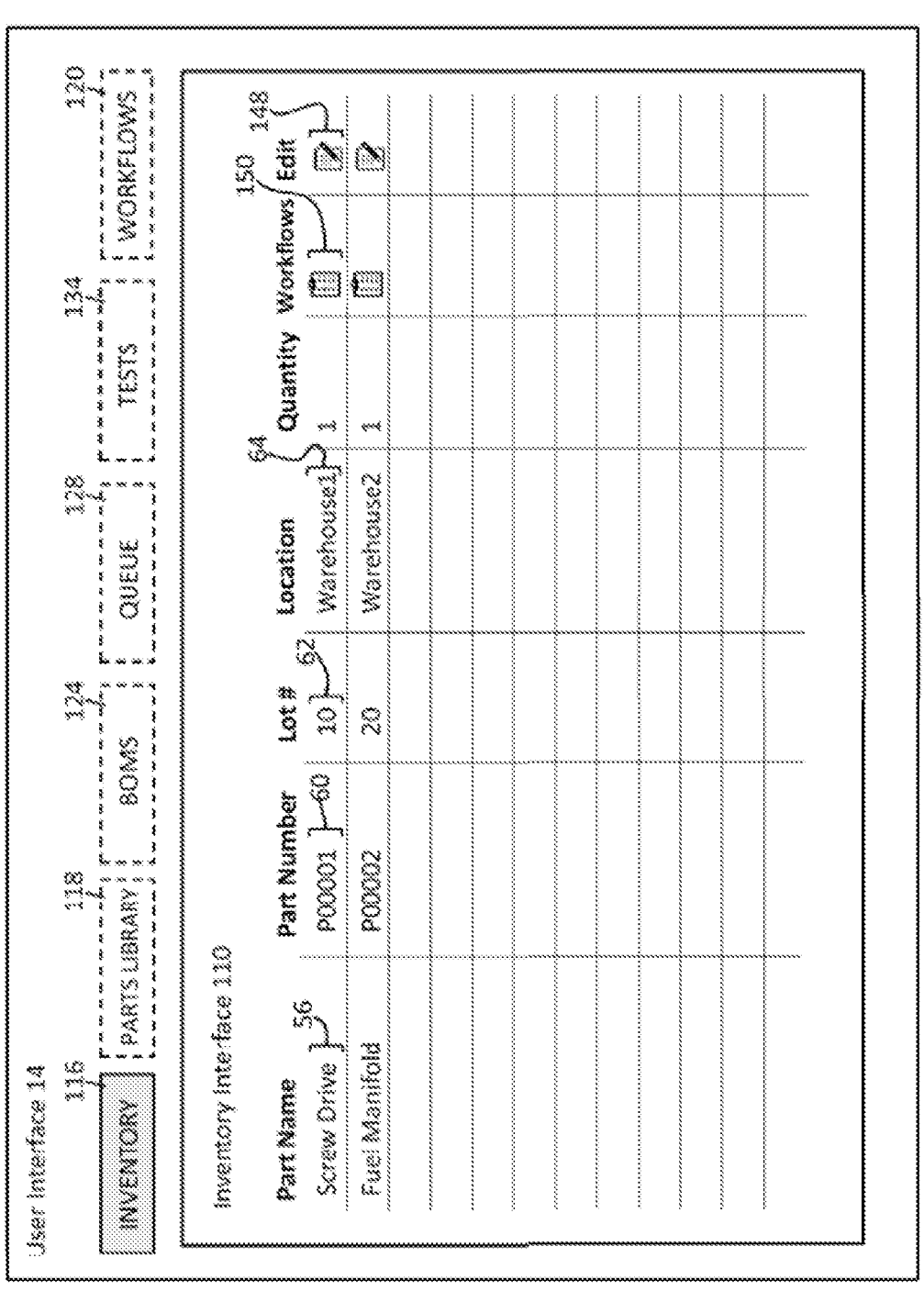
FIG. 6 schematically illustrates the inventory interface within the user interface of FIG. 1.
Figure 7:
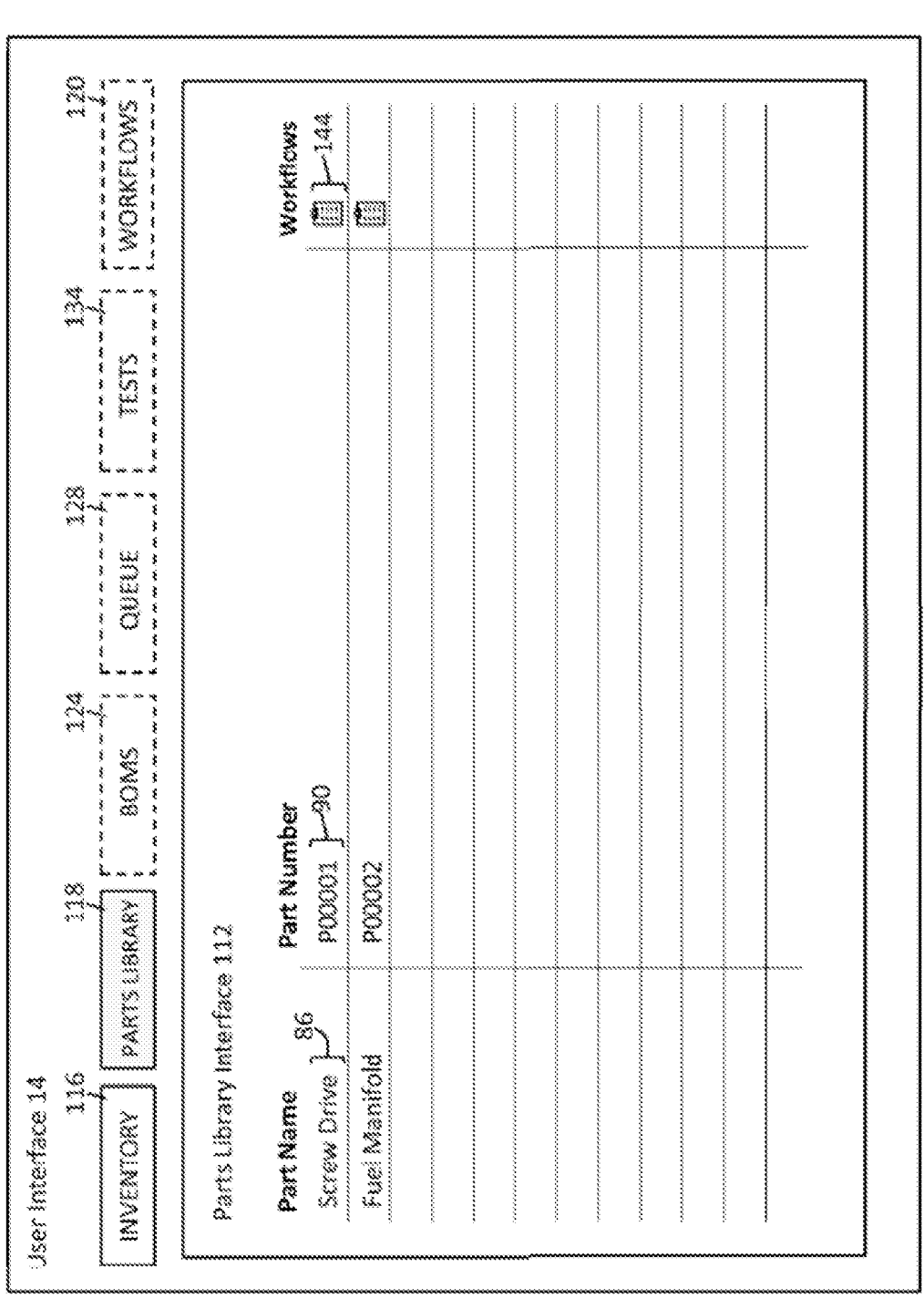
FIG. 7 schematically illustrates the parts library interface within the user interface of FIG. 1.
Figure 8:
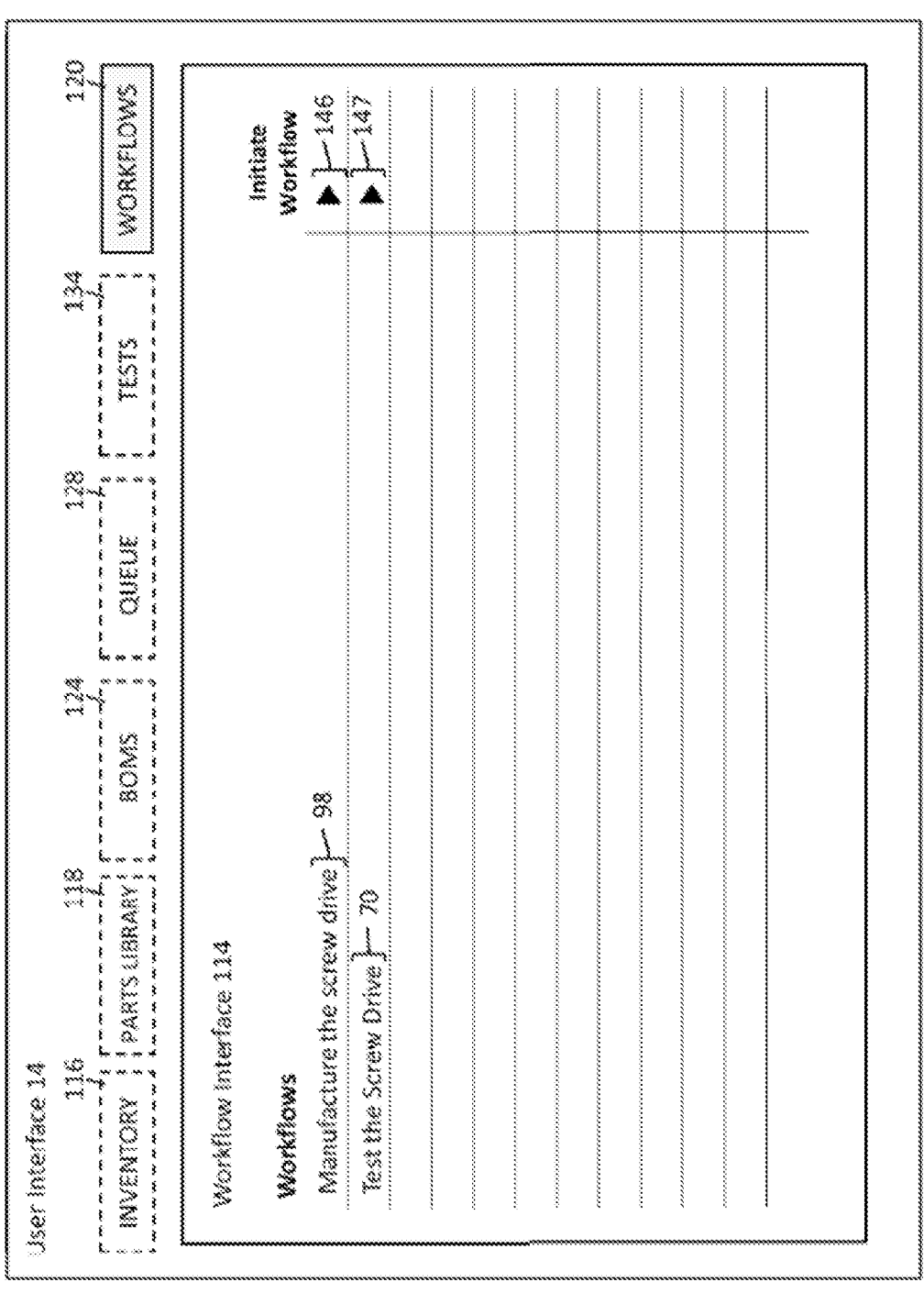
FIG. 8 schematically illustrates the workflow interface within the user interface of FIG. 1.

Referring to FIGS. 6-8, in some embodiments, the user interface 14 includes at least one of an inventory interface 110 (see FIG. 6) for interfacing with data logged to the inventory node 34, a parts library interface 112 (see FIG. 7) for interfacing with data logged to the parts library node 36, a test interface 132 (see FIG. 11) for interfacing with data logged to at least the test node 37, and a workflow interface 114 (see FIG. 8) for interfacing with data logged to the workflow node 38. Referring to FIGS. 6-8 and 11, in the illustrated embodiment the user interface 14 displays respective tabs 116, 118, 134, 120 for accessing the inventory interface 110, the parts library interface 112, the test interface 132, and the workflow interface 114.

In some embodiments, the data fusion engine 20 is configured to generate an index of all BOM data saved to the hierarchical data structure 22. Referring to FIG. 4, for example, the first part node 42₁ includes at least one BOM 94, and the data fusion engine 20 is configured to generate an index of all such BOMs logged to the part nodes 42.

Figure 9:
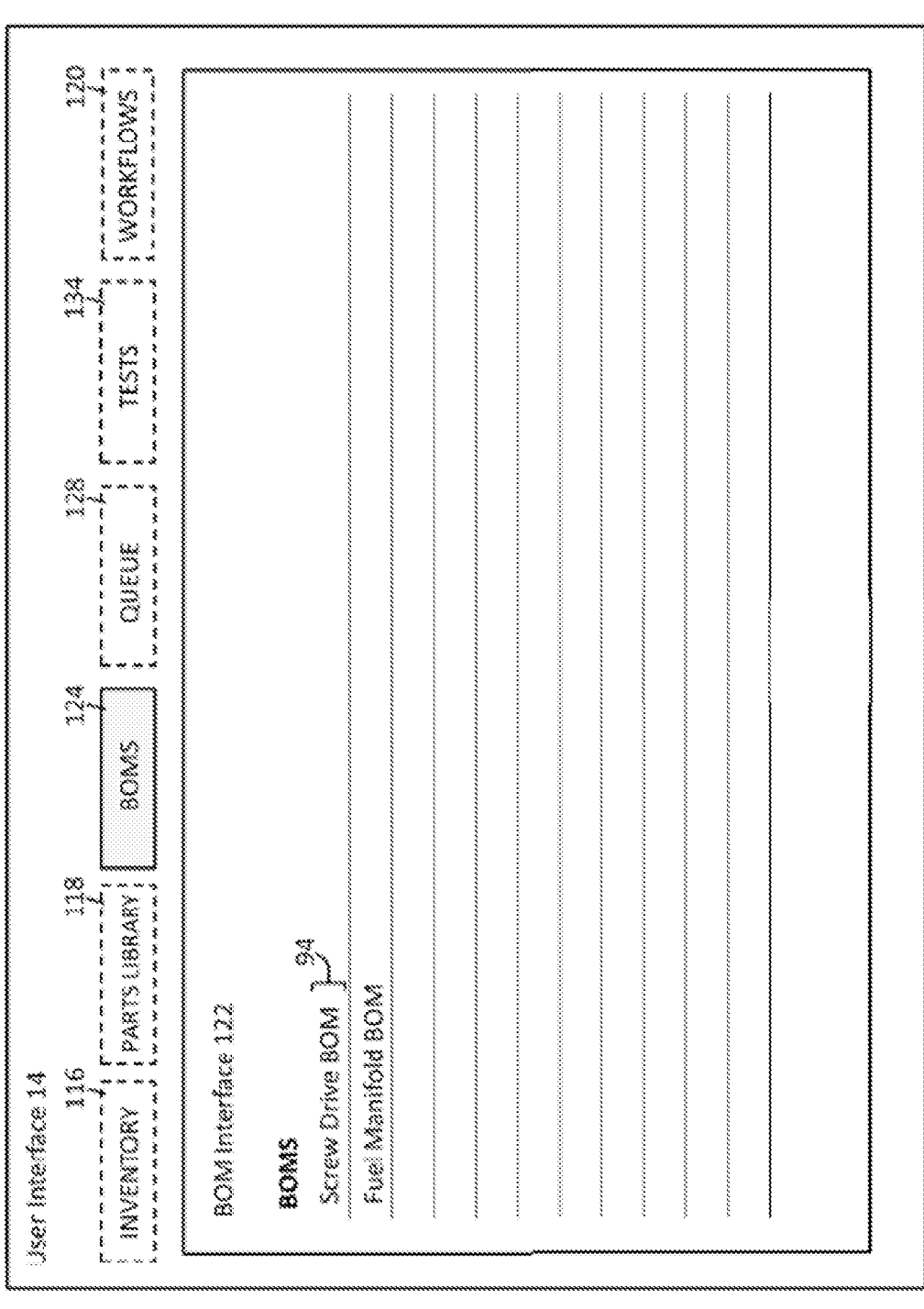
FIG. 9 schematically illustrates the bills of materials (BOM) interface within the user interface of FIG. 1.

Referring to FIG. 9, in some embodiments, the user interface 14 includes a BOM interface 122 for interfacing with the index of BOMs generated by the data fusion engine 20. The BOM interface 122 is accessible via a tab 124 displayed on the user interface 14.

Figure 10:
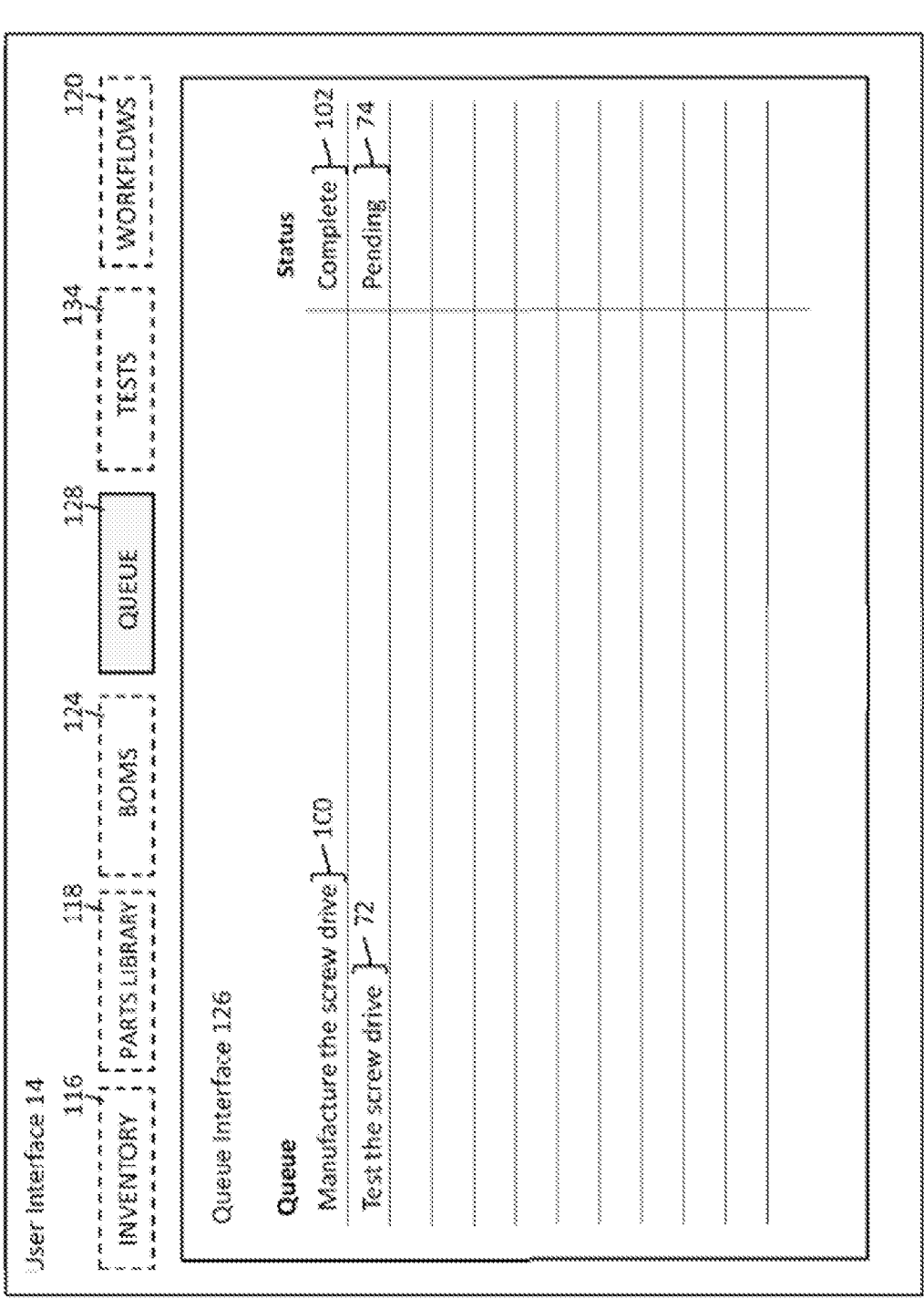
FIG. 10 schematically illustrates the queue interface within the user interface of FIG. 1.

In some embodiments, the data fusion engine 20 is configured to generate a queue that lists all completed, in progress, and/or pending tasks of the workflow instances 28 logged to hierarchical data structure 22. Referring to FIG. 10, in some embodiments, the user interface 14 includes a queue interface 126 for interfacing with the queue generated by the data fusion engine 20. The queue interface 126 is accessible via a tab 128 displayed on the user interface 14.

Referring to FIG. 1, in some embodiments, the data fusion engine 20 is in data communication with at least one test sensor 130 for generating test data regarding one or more inventory items and/or one or more parts to be manufactured. In the illustrated embodiment, the data fusion engine 20 is configured to: trigger the test sensor 130 to begin generating test data; receive the test data from the test sensor 130; and log the test data to a test result field 51 of a test instance 49 linked to at least one of the inventory node 34 (see FIG. 3), the parts library node 36 (see FIG. 4), and the test node 37 (see FIG. 5). In some embodiments, each inventory item node 40 includes a single test instance 49 to which all test results are logged. In other embodiments, the data fusion engine 20 is configured to create a new test instance 49 each time a new test is performed on the respective inventory item or part to be manufactured.

Referring to FIG. 1, in some embodiments, the data fusion engine 20 is in data communication with at least one integrated SaaS tool 136, and the integrated SaaS tool 136 is configured to create and/or edit data (including the work-flow templates 44, workflow instances 28, and workflow scopes 29) to be logged to the hierarchical data structure 22 of the database 18 based on user input 30 received via the user interface 14. In some embodiments, the integrated SaaS tool 136 is Jira™, Microsoft Excel®, Google Sheets®, and/or another commercially available software capable of providing the functionality described herein.

In some embodiments, the integrated SaaS tool 136 creates and/or edits data (including the workflow templates 44, workflow instances 28, and workflow scopes 29) based on user input 30 received via the user interface 14, and data fusion engine 20 transmits the data from the integrated SaaS tool 136 to the hierarchical data structure 22 of the database 18 to be logged. In some such embodiments, the data fusion engine 20 is also configured to create and/or edit data (including the workflow templates 44, workflow instances 28, and workflow scopes 29) independent of the integrated SaaS tool 136.

The various connections between the components of the system 10 can include wired and/or wireless connections. Wired connections can be made by any type of conductive transmission line. Referring to FIG. 1, in some embodiments, one or more components of the system 10 can be connected via one or more network 140, 142 connections (e.g., via the Internet and/or via a personal area network (PAN), a local area network (LAN), a wide area network (WAN), etc.).

The functionality of the client computers 12, the server 16, the data fusion engine 20, the workflow scope selector 21, the database 18, the integrated SaaS tool 136, the test sensor 130, and/or components thereof can be implemented using analog and/or digital hardware (e.g., counters, switches, logic devices, memory devices, programmable processors, non-transitory computer-readable storage mediums), software, firmware, or a combination thereof. In some embodiments, the client computers 12, the server 16, the data fusion engine 20, the workflow scope selector 21, the database 18, the integrated SaaS tool 136, the test sensor 130, and/or one or more components thereof, can perform one or more of the functions described herein by executing software, which can be stored, for example, in a non-transitory computer-readable storage medium.

The terms "managing," "scheduling," "communicating," "logging," "linking," "allowing," "editing," "indexing," "generating," "saving," and variations thereof, are each used herein to refer to one or more actions and/or processes that can be implemented, for example, via a programmable processor or similar electronic computing device by manipulating and/or transforming data within the processor's memory into other data within the processor's memory.

Referring to FIG. 7, during operation of the system 10, a user may navigate to the parts library interface 112 and select a part to be manufactured. In the illustrated embodiment, the part associated with the first part node 42₁ is to be selected for manufacturing. Referring to FIGS. 4 and 7, the part has the name "Screw Drive" logged to the name field 86 and the number "P00001" logged to the serial number field 90. The part has a workflow instance 28₂ based on the workflow template 44₂ (see FIG. 4).

Referring to FIG. 7, the user can initiate this workflow instance 28₂ by clicking the icon 144 at the end of the row. If there were more than one workflow instance 28 associated with the part, clicking the icon 144 would cause a pop-up to appear. The pop-up would provide a list of the workflow instances that can be selected for the respective part.

Referring to FIG. 8, the user can toggle to the workflow interface 114 by clicking on the workflows tab 120 at the top of the user interface 14. In the workflow interface 114, the user can see the name "Manufacture the screw drive" that is logged to the name field 98 of the workflow instance 28₂ (see FIG. 4). The user can initiate the workflow instance 28₂ (e.g., to cause execution of the manufacturing of the screw drive according to operations defined by the workflow instance 28₂) by clicking the icon 146 at the end of the row.

Referring to FIG. 9, the user can toggle to the BOM interface 112 by clicking on the BOM tab 124 at the top of the user interface 14. There, the user can view the BOM 94 associated with the part. In the BOM interface 122, a hyperlink with the text "Screw Drive BOM" will be displayed. The user can click on the hyperlink to open the BOM 94.

Referring to FIG. 10, after the part is manufactured, the queue interface 126 will update to indicate that the status field 102 of the workflow instance 28₂ named "Manufacture the screw drive" has changed from "Pending" or "In Progress" to "Complete." The user can toggle to the queue interface 126 by selecting the queue tab 128 at the top of the user interface 14.

Figure 11:
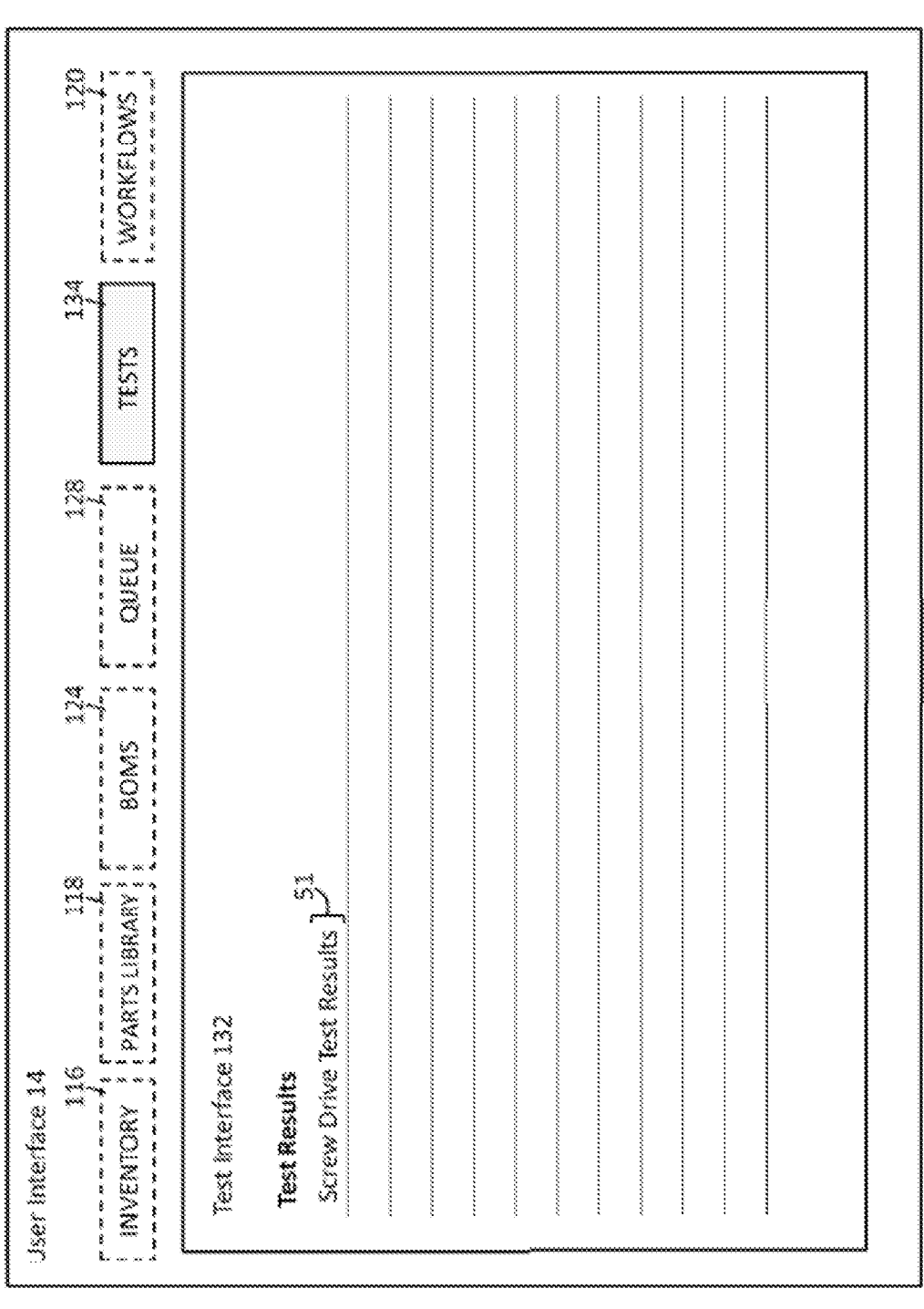
FIG. 11 schematically illustrates the test interface within the user interface of FIG. 1.

Referring to FIG. 3, after detecting the completion of the workflow instance 28₂ (i.e., the manufacturing of the Screw Drive part), the data fusion engine 20 will create the inventory item node 40₁ corresponding to the new Screw Drive inventory item. Referring to FIG. 6, the user can toggle to the inventory interface 110 by clicking on the inventory tab 116 at the top of the user interface 14. There, the user will see a row with the name field 56, serial number field 60, lot number field 62, and the location number field 64 associated with the Screw Drive inventory item. If it becomes necessary to edit any of the data displayed in the row, the user can do so by clicking on the edit icon 148 at the end of the row. Clicking on the icon 148 will open an editor interface through which the user can make the necessary edits to the data logged to the inventory item node 40₁ associated with the Screw Drive inventory item. The user can also select the workflow icon 150 to view a pop-up listing any workflows associated with the part. Referring to FIG. 3 and FIG. 8, the inventory item node 40₁ includes the workflow instance 28₁ named "Test the Screw Drive", which is based on the workflow template 44₁. Referring to FIG. 8, the user can initiate the workflow instance 28₁ by clicking the icon 147 in the row with the name field 70 of "Test the Screw Drive". This will prompt the data fusion engine 20 to trigger the test sensor 130 to begin generating test data regarding the inventory item; receive the test data from the test sensor 130; and save the test data to the test result field 51 of the test instance 49 linked to the inventory node 34 (see FIG. 3) and the test node 37 (see FIG. 5). In the illustrated embodiment, the test instance 49 and test result field 51 are linked to the item test result node 50 of the first inventory item node 40₁ (see FIG. 3) and to the first test template 43₁ linked to the test node 37 (see FIG. 5). Referring to FIG. 11, the user can toggle to the test interface 132 by selecting the tests tab 134 at the top of the user interface 14. In the test interface 132, a hyperlink with the text "Screw Drive Test Results" will be displayed. The user can click on the hyperlink to open the test result field 51 including the test data. Referring to FIG. 10, after the test is complete, the queue interface 126 will update to indicate that the status field 74 of the workflow instance 28₁ named "Test the Screw Drive" has changed from "Pending" or "In Progress" to "Complete."

Another aspect of the invention involves a method for managing resources and scheduling. The method includes the steps of: providing at least one user interface 14 on at least one client computer 12; storing data in at least one hierarchical data structure having at least one parent node 24 and a plurality of child nodes 26, and logging at least one workflow to at least one of the plurality of child nodes 26 based on user input 30 received via the at least one user interface 14. Another aspect of the invention involves a non-transitory computer-readable storage medium that stores instructions to be executed by at least one computer. The instructions, when executed, cause the at least one computer to perform steps including: providing at least one user interface 14 on at least one client computer 12; storing data in at least one hierarchical data structure 22 having at least one parent node 24 and a plurality of child nodes 26; and logging at least one workflow to at least one of the plurality of child nodes 26 based on user input 30 received via the user interface 14.

In some embodiments, a method for managing items includes some or all of the steps of: defining a workflow scope for a template item; receiving a request to associate an item associated with a scope to an other item; determining whether the scope for the item aligns with characteristics of the other item; and in response to determining that the scope for the item aligns with characteristics of the other item, linking (or "logging") the item to the other item; or in response to determining that the scope for item does not align with characteristics of the other item, not linking the item to the other item. In some embodiments, the item includes a template item (e.g., a workflow template or a procedure template) or an instance generated based on a template item (e.g., a workflow instance or a procedure instance). In some embodiments, provided is a non-transitory computer-readable storage medium having instructions stored thereon that are executable a computer processor to cause the method operations described.

As will be apparent in view of the above-described functionality of the system 10 and the various components thereof, the steps of the methods can include various sub-steps, and/or various other steps in addition to the above-described steps. Furthermore, in some embodiments, the method can include more steps or less steps than those discussed herein.

Figure 12:
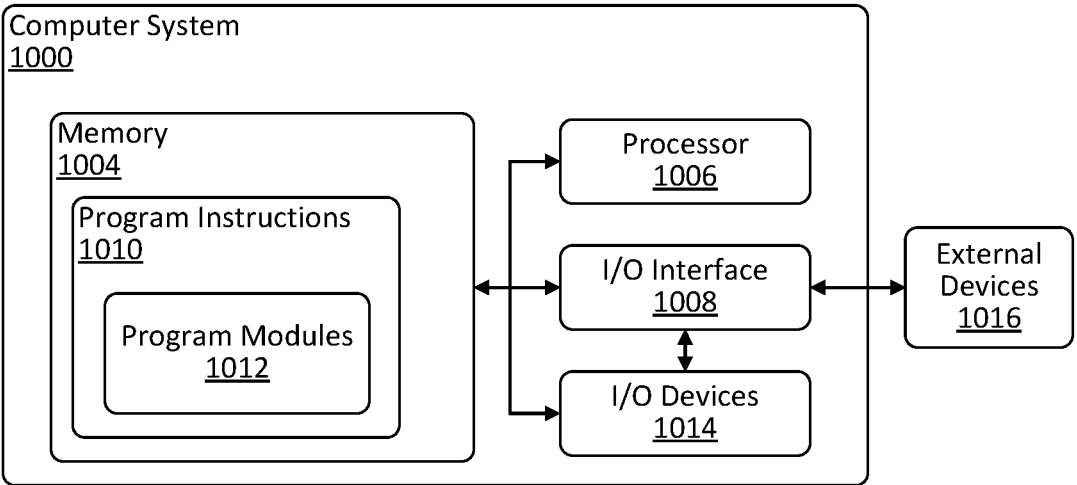
FIG. 12 schematically illustrates an example computer system.

FIG. 12 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), program-mable read-only memory (PROM), erasable programmable read-only memory (EPROM), electrically erasable program-mable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transi-tory computer-readable storage medium having program instructions 1010 stored on the medium. The program instructions 1010 may include program modules 1012 that are executable by a computer processor (e.g., the processor 1006) to cause the functional operations described, such as those described with regard to the entities described (e.g., client computer 12, server 16, database 18, data fusion engine 20, workflow scope selector 21, SaaS platform 25, or a user interacting with user input 30).

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different process-ing cores to generate a simulation of a reservoir. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, computer systems, servers or electronic communication networks. In some embodiments, the I/O interface 1008 includes an antenna or a transceiver.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodi-ments. Accordingly, aspects of the invention are not to be restricted in light of the exemplary embodiments illustrated in the drawings. It will also be apparent to those of ordinary skill in the art that variations and modifications can be made without departing from the true scope of the present disclo-sure. For example, in some instances, one or more features disclosed in connection with one embodiment can be used alone or in combination with one or more features of one or more other embodiments.

The described embodiments may be understood in view of the following enumerated example embodiments:

1. A system for managing resources and scheduling, comprising:
   a client computer;
   software executable by the client computer for provid-ing a user interface;
   a server in data communication with the client com-puter;
   a database for storing data in a hierarchical data struc-ture having a parent node and child nodes linked to the parent node;
   a data fusion engine executing on the server, the data fusion engine configured to log a workflow to at least one of the child nodes based on user input received via the user interface.

2. The system of embodiment 1, wherein at least one of the child nodes is a leaf node; and
   wherein the data fusion engine is configured to log the workflow to the leaf node.

3. The system of embodiment 1, wherein the workflow includes a workflow template and a workflow instance based on the workflow template.

4. The system of embodiment 3, wherein the workflow further includes a workflow scope linked to the work-flow template; and
   wherein the workflow scope identifies the child nodes and/or types of child nodes to which the workflow template and the workflow instance are logged or will be logged.

5. The system of embodiment 4, wherein the data fusion engine includes a workflow scope selector configured to log the workflow template and the workflow instance to the child nodes and/or types of child nodes identified by the workflow scope.

6. The system of embodiment 1, wherein the workflow includes a task to be executed and a status of the task.

7. The system of embodiment 6, wherein the data fusion engine is configured to monitor the workflow for detec-tion of a change in the status of the task;
   wherein the data fusion engine is configured to execute a rules-based action in response to the detection of the change in the status of the task; and
   wherein the rules-based action includes at least one of instantiating another workflow instance, executing another workflow instance, generating an approval request, and transmitting an approval request.

8. The system of embodiment 1, wherein the data fusion engine is configured to log the workflow to the at least one child node based on no-code user input received via the user interface.

9. The system of embodiment 1, wherein the data fusion engine is configured to log the workflow to the at least one child node based on low-code user input received via the user interface.

10. The system of embodiment 1, wherein the system is an enterprise system configured for use by a plurality of users; and
    wherein the data fusion engine is configured to log a workflow to at least one of the child nodes based on user input received via the user interface from any of the plurality of users of the enterprise system.

11. The system of embodiment 1, wherein the parent node is defined by a parent directory;

wherein at least some of the child nodes are defined by inventory item nodes, each corresponding to a real-world inventory item; and wherein the data fusion engine is configured to log the workflow to at least one of the inventory item nodes based on user input received via the user interface.

12. The system of embodiment 11, wherein at least some of the child nodes are defined by part nodes, each including a design file for a respective part to be manufactured; and wherein the data fusion engine is configured to log a second workflow to at least one of the part nodes based on user input received via the user interface.

13. The system of embodiment 12, wherein at least one of the child nodes is defined by a test node; and wherein the data fusion engine is configured to log a third workflow to the test node.

14. The system of embodiment 13, wherein the user interface includes at least one of an inventory interface for user interfacing with the inventory node, a parts library interface for user interfacing with the parts library node, and a test interface for user interfacing with the test node.

15. The system of embodiment 1, wherein the data fusion engine is configured to edit data saved to hierarchical data structure based on user input received via the user interface.

16. The system of embodiment 1, wherein the child nodes are defined by at least one of a file, a record, a field, a template, and an instance.

17. The system of embodiment 1, wherein the data fusion engine is in data communication with an integrated software-as-a-service (SaaS) tool;

wherein the workflow is at least one of created and edited by the integrated SaaS tool based on user input received via the user interface; and wherein the data fusion engine is configured to log the workflow to the at least one child node after the workflow is at least one of created and edited by the integrated SaaS tool.

18. The system of embodiment 17, wherein the data fusion engine is configured to create and edit workflows independent of the integrated SaaS tool based on user input received via the user interface.

19. The system of embodiment 1, wherein the data fusion engine is configured to generate an index of all bill of materials (BOM) saved in the database; and wherein the user interface includes a BOM interface for displaying the index.

20. The system of embodiment 1, wherein the data fusion engine is configured to generate a queue including all completed, in progress, and/or pending tasks associated with workflows saved to the hierarchical data structure; and wherein the user interface includes a queue interface for displaying the queue.

21. The system of embodiment 1, wherein the data fusion engine is in data communication with a test sensor configured to generate test data regarding a real-world inventory item;

wherein at least one of the child nodes is an inventory item node corresponding to the real-world inventory item; and wherein the data fusion engine is configured to receive the test data from the test sensor and log the test data to the inventory item node.

22. The system of embodiment 1, wherein the data fusion engine is in data communication with a test sensor configured to generate test data regarding a part to be manufactured;

wherein at least one of the child nodes is a part node corresponding to the part to be manufactured; and wherein the data fusion engine is configured to receive the test data from the test sensor and log the test data to the part node.

23. A system, comprising:

a client computer;

software executable by the client computer for providing a user interface;

a server in data communication with the client computer;

a database having a parent directory and nodes linked to the parent directory, each of the nodes associated with a respective real-world inventory item or a respective part to be manufactured;

a data fusion engine executing on the server, the data fusion engine configured to log a workflow to at least one of the nodes based on user input received via the user interface.

24. A method for managing resources and scheduling, comprising:

providing a user interface on a client computer;

storing data in a hierarchical data structure having a parent node and a plurality of child nodes; and logging a workflow to at least one of the plurality of child nodes based on user input received via the user interface.

25. A non-transitory computer-readable storage medium that stores instructions to be executed by at least one computer, wherein the instructions cause the at least one computer to perform steps comprising:

providing a user interface on a client computer;

storing data in a hierarchical data structure having a parent node and a plurality of child nodes; and logging a workflow to at least one of the plurality of child nodes based on user input received via the user interface.

26. A SaaS platform, comprising:

a server in data communication with a plurality of client computers;

a database for storing data in a hierarchical data structure having a parent node and child nodes linked to the parent node; and a data fusion engine executing on the server, the data fusion engine configured to log a workflow to at least one of the child nodes based on user input received via at least one client computer of the plurality of client computers.

27. A system for performing an item workflow, the system comprising:

a database storing:

a hierarchical data structure comprising a parent node and child nodes linked to the parent node, a child node of the child nodes being associated with an item; and a workflow template for defining a workflow comprising one or more tasks and one or more variables; and a data fusion engine comprising non-transitory computer readable storage medium comprising program instructions stored thereon that are executable by a processor to perform the following operations:

receiving, via a user interface, user input comprising:

a user selection to log the workflow with the item; and a data value;

in response to receiving the user input:

generating, based on the workflow template, a workflow instance node comprising:

the data value; and a status of the one or more tasks of the workflow; and linking, in the hierarchical data structure, the workflow instance node as a child of the child node associated with the item;

presenting, via a user interface, an indication of the workflow, the data value and the status of the one or more tasks of the workflow in association with the item;

receiving, via a user interface, a user selection to initiate the workflow for the item;

executing, in response to the user selection to initiate the workflow for the item, one or more tasks of the workflow;

updating, in response to execution of the one or more tasks of the workflow, the status of the one or more tasks of the workflow instance node to reflect execution of the one or more tasks of the workflow; and presenting, via a user interface based on the updating of the status of the one or more tasks of the workflow instance node, an indication of the workflow, the data value and the updated status of the one or more tasks of the workflow in association with the item.

28. The system of embodiment 27, the operations further comprising:

monitoring the status of the one or more tasks of the workflow;

determining, based on the monitoring, a change in the status of the one or more tasks of the workflow; and in response to determining the change in the status of the one or more tasks of the workflow, executing a workflow or transmitting an approval request to one or more users.

29. The system of embodiment 27, wherein a workflow scope associated with the workflow template, and wherein the workflow scope identifies child nodes to which the workflow template can be logged.

30. The system of embodiment 29, wherein the workflow scope for the workflow template defines one or more types of nodes to which the workflow template can be logged, the operations further comprising:

determining, by a workflow scope selector based on the workflow scope associated with the workflow template, that the child node associated with the item is a type of node to which the workflow template can be logged, wherein the linking of the workflow instance node as a child of the child node associated with the item is performed responsive to the determining that the child node associated with the item is of the type of node to which the workflow template can be logged.

31. The system of embodiment 30, the operations further comprising:

receiving a user selection to log the workflow with a second item;

determining, by the workflow scope selector based on the workflow scope associated with the workflow template, that a second child node associated with the second item is not a type of node to which the workflow template can be logged; and not linking, responsive to determining that a second child node associated with the second item is not of the type of node to which the workflow template can be logged, the workflow instance node as a child of the second child node associated with the second item.

32. The system of embodiment 27, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

33. The system of embodiment 27, wherein the item comprises a part and the one or more tasks comprise testing or manufacturing of the part, wherein the one or more tasks of the workflow are executed, based on the linking of the workflow template with the item, to test or manufacture of the part.

34. A method for performing an item workflow, the method comprising:

storing, in database:

a hierarchical data structure comprising a parent node and child nodes linked to the parent node, a child node of the child nodes being associated with an item; and a workflow template for defining a workflow comprising one or more tasks and one or more variables;

receiving, via a user interface, user input comprising:

a user selection to log the workflow with the item; and a data value;

in response to receiving the user input:

generating, based on the workflow template, a workflow instance node comprising:

the data value; and a status of the one or more tasks of the workflow; and linking, in the hierarchical data structure, the workflow instance node as a child of the child node associated with the item;

presenting, via a user interface, an indication of the workflow, the data value and the status of the one or more tasks of the workflow in association with the item;

receiving, via a user interface, a user selection to initiate the workflow for the item;

executing, in response to the user selection to initiate the workflow for the item, one or more tasks of the workflow;

updating, in response to execution of the one or more tasks of the workflow, the status of the one or more tasks of the workflow instance node to reflect execution of the one or more tasks of the workflow; and presenting, via a user interface based on the updating of the status of the one or more tasks of the workflow instance node, an indication of the workflow, the data value and the updated status of the one or more tasks of the workflow in association with the item.

35. The method of embodiment 34, the method further comprising:

monitoring the status of the one or more tasks of the workflow;

determining, based on the monitoring, a change in the status of the one or more tasks of the workflow; and in response to determining the change in the status of the one or more tasks of the workflow, executing a workflow or transmitting an approval request to one or more users.

36. The method of embodiment 34, wherein a workflow scope is associated with the workflow template, and wherein the workflow scope identifies child nodes to which the workflow template can be logged.

37. The method of embodiment 36, wherein the workflow scope for the workflow template defines one or more types of nodes to which the workflow template can be logged, the method further comprising:

determining, by a workflow scope selector based on the workflow scope associated with workflow template, that the child node associated with the item is a type of node to which the workflow template can be logged, wherein the linking of the workflow instance node as a child of the child node associated with the item is performed responsive to the determining that the child node associated with the item is of the type of node to which the workflow template can be logged.

38. The method of embodiment 37, the method further comprising:

receiving a user selection to log the workflow with a second item;

determining, by the workflow scope selector based on the workflow scope associated with workflow template, that a second child node associated with the second item is not a type of node to which the workflow template can be logged; and not linking, responsive to determining that a second child node associated with the second item is not of the type of node to which the workflow template can be logged, the workflow instance node as a child of the second child node associated with the second item.

39. The method of embodiment 34, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

40. The method of embodiment 34, the method further comprising:

generating, based on the status of the one or more tasks associated with the item, a task queue indicating statuses of tasks associated with workflows templates of the hierarchical data structure; and presenting, via a user interface, task queue.

41. The method of embodiment 34, wherein the item comprises a part and the one or more tasks comprise testing or manufacturing of the part, the method further comprising executing, based on the linking of the workflow template with the item, the one or more tasks of the workflow to test or manufacture of the part.

42. A non-transitory computer readable storage medium comprising program instructions stored thereon that are executable by a processor to perform the following operations for performing an item workflow:

storing, in database:

a hierarchical data structure comprising a parent node and child nodes linked to the parent node, a child node of the child nodes being associated with an item; and a workflow template for defining a workflow comprising one or more tasks and one or more variables;

receiving, via a user interface, user input comprising:

a user selection to log the workflow with the item; and a data value;

in response to receiving the user input:

generating, based on the workflow template, a workflow instance node comprising:

the data value; and a status of the one or more tasks of the workflow; and linking, in the hierarchical data structure, the workflow instance node as a child of the child node associated with the item;

presenting, via a user interface, an indication of the workflow, the data value and the status of the one or more tasks of the workflow in association with the item;

receiving, via a user interface, a user selection to initiate the workflow for the item;

executing, in response to the user selection to initiate the workflow for the item, one or more tasks of the workflow;

updating, in response to execution of the one or more tasks of the workflow, the status of the one or more tasks of the workflow instance node to reflect execution of the one or more tasks of the workflow; and presenting, via a user interface based on the updating of the status of the one or more tasks of the workflow instance node, an indication of the workflow, the data value and the updated status of the one or more tasks of the workflow in association with the item.

43. The medium of embodiment 42, the operations further comprising:

monitoring the status of the one or more tasks of the workflow;

determining, based on the monitoring, a change in the status of the one or more tasks of the workflow; and in response to determining the change in the status of the one or more tasks of the workflow, executing a workflow or transmitting an approval request to one or more users.

44. The medium of embodiment 42, wherein a workflow scope is associated with the workflow template, and wherein the workflow scope identifies child nodes to which the workflow template can be logged.

45. The medium of embodiment 44, wherein the workflow scope for the workflow template defines one or more types of nodes to which the workflow template can be logged, the operations further comprising:

determining, by a workflow scope selector based on the workflow scope associated with workflow template, that the child node associated with the item is a type of node to which the workflow template can be logged, wherein the linking of the workflow instance node as a child of the child node associated with the item is performed responsive to the determining that the child node associated with the item is of the type of node to which the workflow template can be logged.

46. The medium of embodiment 45, the operations further comprising:

receiving a user selection to log the workflow with a second item;

determining, by the workflow scope selector based on the workflow scope associated with workflow template, that a second child node associated with the second item is not a type of node to which the workflow template can be logged; and not linking, responsive to determining that a second child node associated with the second item is not of the type of node to which the workflow template can be logged, workflow instance node as a child of the second child node associated with the second item.

47. The medium of embodiment 42, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

48. The medium of embodiment 42, wherein the item comprises a part and the one or more tasks comprise testing or manufacturing of the part, and wherein the one or more tasks of the workflow are executed, based on the linking of the workflow template with the item, to test or manufacture of the part.

49. A method comprising:

storing, in database, the following:

a data structure comprising data associated with an item; and a workflow template for defining a workflow comprising one or more tasks and one or more variables;

receiving, via a user interface, user input comprising:

a user selection to associate the workflow with the item; and a data value; and associating, with the item in response to receiving the user input, a workflow instance node corresponding to the workflow template.

50. The method of embodiment 49, wherein the data structure comprises a hierarchical data structure comprising a parent node and child nodes linked to the parent node, wherein the data associated with the item comprising a child node of the child nodes associated with the item, and wherein the associating comprises:

associating, in the hierarchical data structure, a workflow instance node as a child of the child node associated with the item, the workflow instance node comprising:

the data value; and a status of the one or more tasks of the workflow.

51. The method of embodiment 49, the method further comprising:

presenting, via a user interface, an indication of the workflow, the data value and the status of the one or more tasks of the workflow in association with the item.

52. The method of embodiment 49, the method further comprising:

receiving, via a user interface, a user selection to initiate the workflow for the item;

executing, in response to the user selection to initiate the workflow for the item, one or more tasks of the workflow;

updating, in response to execution of the one or more tasks of the workflow, the status of the one or more tasks of the workflow instance node to reflect execution of the one or more tasks of the workflow; and presenting, via a user interface based on the updating of the status of the one or more tasks of the workflow instance node, an indication of the workflow, the data value and the updated status of the one or more tasks of the workflow in association with the item.

53. The method of embodiment 49, wherein the workflow template is associated with a workflow scope that identifies items to which the workflow template can be associated.

54. The method of embodiment 53, the method further comprising:

determining, based on the workflow scope, that the item is an item to which the workflow template can be associated, wherein the associating of the workflow instance node as a child of the child node associated with the item is performed responsive to the determining that the item is an item to which the workflow template can be associated.

55. The method of embodiment 54, the method further comprising:

determining, based on the workflow scope, that a second item is not an item to which the workflow template can be associated, wherein a second workflow instance is not linked with the second item responsive to the determining that the item is not an item to which the workflow template can be associated.

56. The method of embodiment 49, wherein the item comprises a part and the one or more tasks comprise testing or manufacturing of the part, the method further comprising executing, based on the associating of the instance node as a child of the child node associated with the item, the one or more tasks of the workflow to test or manufacture of the part.

What is claimed is:

1. A system for performing an item workflow, the system comprising:

a database storing:

a hierarchical data structure comprising a parent node and child nodes linked to the parent node, a child node of the child nodes being associated with an item; and a workflow template for defining a workflow comprising one or more tasks and one or more variables, the workflow template associated with a workflow scope that defines one or more nodes to which the workflow template can be logged; and a data fusion engine comprising non-transitory computer readable storage medium comprising program instructions stored thereon that are executable by a processor to perform the following operations:

receiving, via a user interface, user input comprising a user selection to log the workflow with the item;

in response to receiving the user input:

generating, based on the workflow template, a workflow instance node;

determining, based on the workflow scope associated with the workflow template, that the child node associated with the item is a node to which the workflow template can be logged; and linking, in the hierarchical data structure in response to determining that the child node associated with the item is a node to which the workflow template can be logged, the workflow instance with the child node associated with the item.

2. The system of claim 1, the operations further comprising:

presenting, via a user interface, an indication of the workflow and a status of the one or more tasks of the workflow in association with the item;

receiving, via a user interface, a user selection to initiate the workflow for the item; and executing, in response to the user selection to initiate the workflow for the item, one or more tasks of the workflow.

3. The system of claim 1, the operations further comprising:

monitoring the status of the one or more tasks of the workflow;

determining, based on the monitoring, a change in the status of the one or more tasks of the workflow; and in response to determining the change in the status of the one or more tasks of the workflow, executing a workflow or transmitting an approval request to one or more users.

4. The system of claim 1, the operations further comprising:

updating, in response to execution of the one or more tasks of the workflow, the status of the one or more tasks of the workflow instance node to reflect execution of the one or more tasks of the workflow; and presenting, via a user interface based on the updating of the status of the one or more tasks of the workflow instance node, an indication of the workflow the updated status of the one or more tasks of the workflow in association with the item.

5. The system of claim 1, the operations further comprising:

receiving a user selection to log the workflow with a second item;

determining, based on the workflow scope associated with the workflow template, that a second child node associated with the second item is not a node to which the workflow template can be logged; and not linking, responsive to determining that the second child node associated with the second item is not a node to which the workflow template can be logged, the workflow instance node with the second child node associated with the second item.

6. The system of claim 1, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

7. The system of claim 1, wherein the item comprises a part and the one or more tasks comprise testing or manufacturing of the part, wherein the one or more tasks of the workflow are executed, based on the linking of the workflow template with the item, to test or manufacture of the part.

8. The system of claim 1, wherein the linking comprises directly linking the workflow instance with the child node associated with the item.

9. A method for performing an item workflow, the method comprising:

storing, in database:

a hierarchical data structure comprising a parent node and child nodes linked to the parent node, a child node of the child nodes being associated with an item; and a workflow template for defining a workflow comprising one or more tasks and one or more variables, the workflow template associated with a workflow scope that defines one or more nodes to which the workflow template can be logged;

receiving, via a user interface, user input comprising a user selection to log the workflow with the item;

in response to receiving the user input:

generating, based on the workflow template, a workflow instance node;

determining, based on the workflow scope associated with the workflow template, that the child node associated with the item is a node to which the workflow template can be logged; and linking, in the hierarchical data structure in response to determining that the child node associated with the item is a node to which the workflow template can be logged, the workflow instance with the child node associated with the item.

10. The method of claim 9, the operations further comprising:

presenting, via a user interface, an indication of the workflow and a status of the one or more tasks of the workflow in association with the item;

receiving, via a user interface, a user selection to initiate the workflow for the item; and executing, in response to the user selection to initiate the workflow for the item, one or more tasks of the workflow.

11. The method of claim 9, the method further comprising:

monitoring the status of the one or more tasks of the workflow;

determining, based on the monitoring, a change in the status of the one or more tasks of the workflow; and in response to determining the change in the status of the one or more tasks of the workflow, executing a workflow or transmitting an approval request to one or more users.

12. The method of claim 9, the method further comprising:

updating, in response to execution of the one or more tasks of the workflow, the status of the one or more tasks of the workflow instance node to reflect execution of the one or more tasks of the workflow; and presenting, via a user interface based on the updating of the status of the one or more tasks of the workflow instance node, an indication of the workflow and an updated status of the one or more tasks of the workflow in association with the item.

13. The method of claim 9, the method further comprising:

receiving a user selection to log the workflow with a second item;

determining, based on the workflow scope associated with workflow template, that a second child node associated with the second item is not a node to which the workflow template can be logged; and not linking, responsive to determining that the second child node associated with the second item is not a node to which the workflow template can be logged, the workflow instance node with the second child node associated with the second item.

14. The method of claim 9, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

15. The method of claim 9, the method further comprising:

generating, based on the status of the one or more tasks associated with the item, a task queue indicating statuses of tasks associated with workflows templates of the hierarchical data structure; and presenting, via a user interface, the task queue.

16. The method of claim 9, wherein the item comprises a part and the one or more tasks comprise testing or manufacturing of the part, the method further comprising executing, based on the linking of the workflow template with the item, the one or more tasks of the workflow to test or manufacture of the part.

17. The method of claim 9, wherein the linking comprises directly linking the workflow instance with the child node associated with the item.

18. A non-transitory computer readable storage medium comprising program instructions stored thereon that are executable by a processor to perform the following operations for performing an item workflow:

storing, in database:

a hierarchical data structure comprising a parent node and child nodes linked to the parent node, a child node of the child nodes being associated with an item; and a workflow template for defining a workflow comprising one or more tasks and one or more variables, the workflow template associated with a workflow scope that defines one or more nodes to which the workflow template can be logged;

receiving, via a user interface, user input comprising a user selection to log the workflow with the item;

in response to receiving the user input:

generating, based on the workflow template, a workflow instance node;

determining, based on the workflow scope associated with the workflow template, that the child node associated with the item is a node to which the workflow template can be logged; and linking, in the hierarchical data structure in response to determining that the child node associated with the item is a node to which the workflow template can be logged, the workflow instance node with the child node associated with the item.

19. The method of claim 18, the operations further comprising:

presenting, via a user interface, an indication of the workflow and a status of the one or more tasks of the workflow in association with the item;

receiving, via a user interface, a user selection to initiate the workflow for the item; and executing, in response to the user selection to initiate the workflow for the item, one or more tasks of the workflow.

20. The medium of claim 18, the operations further comprising:

monitoring the status of the one or more tasks of the workflow;

determining, based on the monitoring, a change in the status of the one or more tasks of the workflow; and in response to determining the change in the status of the one or more tasks of the workflow, executing a workflow or transmitting an approval request to one or more users.

21. The medium of claim 18, the operations further comprising:

updating, in response to execution of the one or more tasks of the workflow, the status of the one or more tasks of the workflow instance node to reflect execution of the one or more tasks of the workflow; and presenting, via a user interface based on the updating of the status of the one or more tasks of the workflow instance node, an indication of the workflow, the data value and an updated status of the one or more tasks of the workflow in association with the item.

22. The medium of claim 18, the operations further comprising:

receiving a user selection to log the workflow with a second item;

determining, based on the workflow scope associated with workflow template, that a second child node associated with the second item is not a node to which the workflow template can be logged; and not linking, responsive to determining that the second child node associated with the second item is not a node to which the workflow template can be logged, workflow instance node with the second child node associated with the second item.

23. The medium of claim 18, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

24. The medium of claim 18, wherein the item comprises a part and the one or more tasks comprise testing or manufacturing of the part, and wherein the one or more tasks of the workflow are executed, based on the linking of the workflow template with the item, to test or manufacture of the part.

25. The medium of claim 18, wherein the linking comprises directly linking the workflow instance with the child node associated with the item.

26. A method comprising:

storing, in database, the following:

a data structure comprising data associated with an item; and a workflow template for defining a workflow comprising one or more tasks and one or more variables, the workflow template associated with a workflow scope that defines items with which the workflow template can be associated;

receiving, via a user interface, user input comprising a user selection to associate the workflow with the item;

determining, based on the workflow scope, that the item is an item to which the workflow template can be associated; and linking, in response to receiving the user input and determining that the item is an item to which the workflow template can be associated, the item with a workflow instance node corresponding to the workflow template.

27. The method of claim 24,
wherein the data structure comprises a hierarchical data structure comprising a parent node and child nodes linked to the parent node, wherein the data associated with the item comprising a child node of the child nodes associated with the item, and
wherein the linking comprises:
    linking, in the hierarchical data structure, a workflow instance node as a child of the child node associated with the item, the workflow instance node comprising a status of the one or more tasks of the workflow.

28. The method of claim 24, the method further comprising:
    presenting, via a user interface, an indication of the workflow and the status of the one or more tasks of the workflow in association with the item.

29. The method of claim 24, the method further comprising:
    receiving, via a user interface, a user selection to initiate the workflow for the item;
    executing, in response to the user selection to initiate the workflow for the item, one or more tasks of the workflow;
    updating, in response to execution of the one or more tasks of the workflow, the status of the one or more tasks of the workflow instance node to reflect execution of the one or more tasks of the workflow; and
presenting, via a user interface based on the updating of the status of the one or more tasks of the workflow instance node, an indication of the workflow and the updated status of the one or more tasks of the workflow in association with the item.

30. The method of claim 24, the method further comprising:
    determining, based on the workflow scope, that a second item is not an item to which the workflow template can be associated,
    wherein a second workflow instance is not linked with the second item responsive to the determining that the item is not an item to which the workflow template can be associated.

31. The method of claim 24, wherein the item comprises a part and the one or more tasks comprise testing or manufacturing of the part, the method further comprising executing, based on the associating of the instance node as a child of the child node associated with the item, the one or more tasks of the workflow to test or manufacture of the part.

32. The method of claim 24, wherein the linking comprises directly linking the item with the workflow instance node corresponding to the workflow template.

* * * * *